US011831715B1

(12) United States Patent
DeSanti et al.

(10) Patent No.: US 11,831,715 B1
(45) Date of Patent: Nov. 28, 2023

(54) SCALABLE ETHERNET BUNCH OF FLASH (EBOF) STORAGE SYSTEM

(71) Applicant: Dell Products L.P., Round Rock, TX (US)

(72) Inventors: Claudio DeSanti, Santa Cruz, CA (US); Joseph Lasalle White, San Jose, CA (US); Erik P. Smith, Douglas, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/172,587

(22) Filed: Feb. 22, 2023

Related U.S. Application Data

(60) Provisional application No. 63/417,643, filed on Oct. 19, 2022.

(51) Int. Cl.
*H04L 67/1097* (2022.01)
*H04L 45/17* (2022.01)
*H04L 45/745* (2022.01)
*H04L 61/255* (2022.01)

(52) U.S. Cl.
CPC .......... *H04L 67/1097* (2013.01); *H04L 45/17* (2022.05); *H04L 45/745* (2013.01); *H04L 61/255* (2013.01)

(58) Field of Classification Search
CPC ............. G06F 16/9014; G06F 12/1072; G06F 12/0292; G06F 12/10; H04L 67/2517; H04L 61/2503; H04L 61/2514
See application file for complete search history.

(56) References Cited

U.S. PATENT DOCUMENTS

| | | | |
|---|---|---|---|
| 7,219,161 B1 * | 5/2007 | Fagundo ............. | H04L 61/2517 709/229 |
| 7,480,305 B1 * | 1/2009 | Somasundaram .. | H04L 61/2517 370/466 |
| 7,609,701 B2 * | 10/2009 | Yang .................... | H04L 61/2514 370/409 |
| 10,027,624 B1 * | 7/2018 | Salour ................. | H04L 61/5007 |
| 10,122,682 B1 * | 11/2018 | Salour ..................... | H04M 3/54 |
| 10,237,235 B1 * | 3/2019 | Dickinson ........... | H04L 61/2517 |
| 10,841,275 B2 * | 11/2020 | Worley .................... | H04L 69/22 |

(Continued)

*Primary Examiner* — Shean Tokuta
(74) *Attorney, Agent, or Firm* — Joseph Mencher

(57) ABSTRACT

A scalable EBOF storage system identifies its storage devices and external physical interfaces, and respective public IP addresses assigned to each external physical interface. The scalable EBOF storage system assigns a respective private IP address to each storage device, private port identifier(s) to the storage devices, and respective public port identifier(s) to each storage device. The scalable EBOF storage system then generates an EBOF NAT table by mapping, for each storage device: each respective public IP address assigned to the external physical interfaces to the public port identifier assigned to that storage device to provide a public connection information combination for that storage device, the private IP address assigned to that storage device to the private port identifier assigned to that storage device to provide a private information connection combination for that storage device, and the public information connection combination to the private information connection combination for that storage device.

20 Claims, 23 Drawing Sheets

(56) References Cited

U.S. PATENT DOCUMENTS

| | | | |
|---|---|---|---|
| 2006/0159032 A1* | 7/2006 | Ukrainetz | H04L 61/5007 370/254 |
| 2008/0198858 A1* | 8/2008 | Townsley | H04L 61/2535 370/392 |
| 2009/0125633 A1* | 5/2009 | Watsen | H04L 63/029 709/229 |
| 2010/0198979 A1* | 8/2010 | Pickens | H04L 61/256 709/231 |
| 2015/0312230 A1* | 10/2015 | Choi | H04L 61/2575 713/171 |
| 2015/0365323 A1* | 12/2015 | Duminuco | H04L 47/2441 370/235 |
| 2016/0224277 A1* | 8/2016 | Batra | H04L 41/12 |
| 2016/0227265 A1* | 8/2016 | Harrison | H04L 63/10 |
| 2017/0366978 A1* | 12/2017 | Ahmadzadeh | H04L 41/12 |
| 2018/0167352 A1* | 6/2018 | Worley | H04L 69/22 |
| 2019/0052558 A1* | 2/2019 | Mehta | H04L 45/64 |
| 2019/0058690 A1* | 2/2019 | Huang | H04L 61/2517 |
| 2019/0166091 A1* | 5/2019 | Gupta | H04L 61/2571 |
| 2019/0245828 A1* | 8/2019 | Ossipov | H04L 61/2514 |
| 2019/0320018 A1* | 10/2019 | Karaje | H04L 67/1095 |
| 2021/0099388 A1* | 4/2021 | Abhigyan | H04L 45/56 |
| 2021/0144104 A1* | 5/2021 | Capper | H04L 61/256 |
| 2021/0288878 A1* | 9/2021 | Smith | G06F 3/0631 |
| 2023/0109231 A1* | 4/2023 | Adogla | H04L 41/40 709/223 |
| 2023/0138546 A1* | 5/2023 | Lee | G06F 11/07 711/154 |

\* cited by examiner

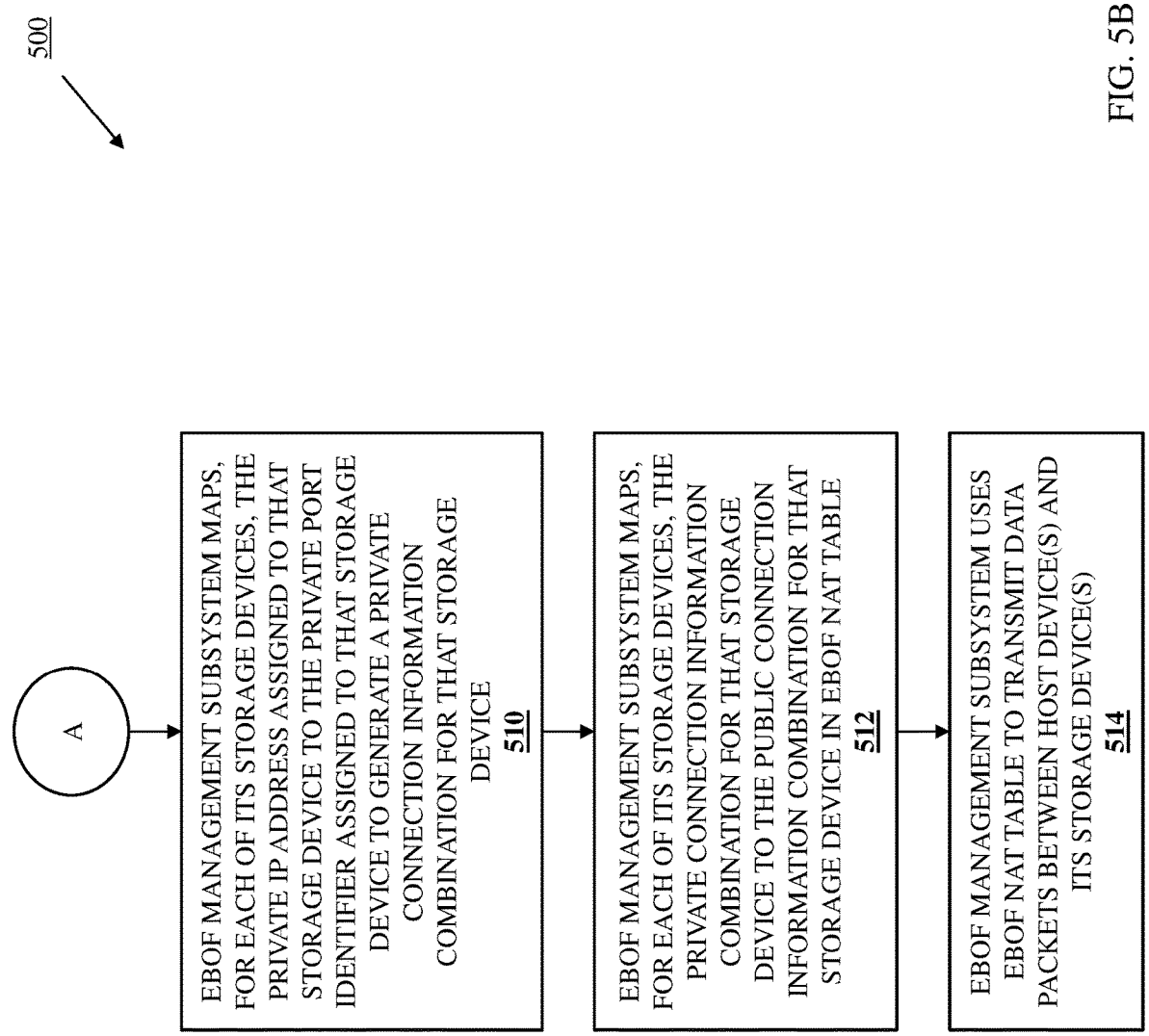

| STORAGE DEVICE | PRIVATE ADDRESS/PORT | PUBLIC ADDRESS/PORT |
|---|---|---|
| STORAGE DEVICE 308a | $IP_{308a}, PORT_{308a}$ | $IP_{306a}, PORT_{306a}(308a)$ |
| | | $IP_{306b}, PORT_{306b}(308a)$ |
| | | ... |
| | | $IP_{306f}, PORT_{306f}(308a)$ |
| STORAGE DEVICE 308b | $IP_{308b}, PORT_{308b}$ | $IP_{306a}, PORT_{306a}(308b)$ |
| | | $IP_{306b}, PORT_{306b}(308b)$ |
| | | ... |
| | | $IP_{306f}, PORT_{306f}(308b)$ |
| ... | | |
| STORAGE DEVICE 308f | $IP_{308f}, PORT_{308f}$ | $IP_{306a}, PORT_{306a}(308f)$ |
| | | $IP_{306b}, PORT_{306b}(308f)$ |
| | | ... |
| | | $IP_{306f}, PORT_{306f}(308f)$ |

EBOF MGMT. DATABASE 304b

FIG. 6B

| STORAGE DEVICE | PRIVATE ADDRESS/PORT | PUBLIC ADDRESS/PORT |
|---|---|---|
| STORAGE DEVICE 308a | $IP_{308a}$, PORT | $IP_{306a}$, PORT($308a$) |
| | | $IP_{306b}$, PORT($308a$) |
| | | ⋮ |
| | | $IP_{306f}$, PORT($308a$) |
| STORAGE DEVICE 308b | $IP_{308b}$, PORT | $IP_{306a}$, PORT($308b$) |
| | | $IP_{306b}$, PORT($308b$) |
| | | ⋮ |
| | | $IP_{306f}$, PORT($308b$) |
| ⋮ | ⋮ | |
| STORAGE DEVICE 308f | $IP_{308f}$, PORT | $IP_{306a}$, PORT($308f$) |
| | | $IP_{306b}$, PORT($308f$) |
| | | ⋮ |
| | | $IP_{306f}$, PORT($308f$) |

EBOF MGMT. DATABASE 304b

| INTERFACE | PRIVATE ADDRESS/PORT | PUBLIC ADDRESS/PORT |
|---|---|---|
| INTERFACE 306a | $IP_{308a}, PORT_{308a}$ | $IP_{306a}, PORT_{306a}(308a)$ |
| | $IP_{308b}, PORT_{308b}$ | $IP_{306a}, PORT_{306a}(308b)$ |
| | ... | |
| | $IP_{308f}, PORT_{308f}$ | $IP_{306a}, PORT_{306a}(308f)$ |
| INTERFACE 306b | $IP_{308a}, PORT_{308a}$ | $IP_{306b}, PORT_{306b}(308a)$ |
| | $IP_{308b}, PORT_{308b}$ | $IP_{306b}, PORT_{306b}(308b)$ |
| | ... | |
| | $IP_{308f}, PORT_{308f}$ | $IP_{306b}, PORT_{306b}(308f)$ |
| ... | | |
| INTERFACE 306f | $IP_{308a}, PORT_{308a}$ | $IP_{306f}, PORT_{306f}(308a)$ |
| | $IP_{308b}, PORT_{308b}$ | $IP_{306f}, PORT_{306f}(308b)$ |
| | ... | |
| | $IP_{308f}, PORT_{308f}$ | $IP_{306f}, PORT_{306f}(308f)$ |

EBOF MGMT. DATABASE 304b

1200a

| INTERFACE | PRIVATE ADDRESS/PORT | PUBLIC ADDRESS/PORT |
|---|---|---|
| INTERFACE 306a | $IP_{308a}$, PORT | $IP_{306a}$, PORT(308a) |
| | $IP_{308b}$, PORT | $IP_{306a}$, PORT(308b) |
| | ... | |
| | $IP_{308f}$, PORT | $IP_{306a}$, PORT(308f) |
| INTERFACE 306b | $IP_{308a}$, PORT | $IP_{306b}$, PORT(308a) |
| | $IP_{308b}$, PORT | $IP_{306b}$, PORT(308b) |
| | ... | |
| | $IP_{308f}$, PORT | $IP_{306b}$, PORT(308f) |
| ... | ... | ... |
| INTERFACE 306f | $IP_{308a}$, PORT | $IP_{306f}$, PORT(308a) |
| | $IP_{308b}$, PORT | $IP_{306f}$, PORT(308b) |
| | ... | |
| | $IP_{308f}$, PORT | $IP_{306f}$, PORT(308f) |

EBOF MGMT. DATABASE 304b

FIG. 12B

SCALABLE ETHERNET BUNCH OF FLASH (EBOF) STORAGE SYSTEM

CROSS-REFERENCE TO RELATED APPLICATION

The present disclosure claims the benefit of U.S. Provisional Patent Application Ser. No. 63/417,643, filed Oct. 19, 2022, the disclosure of which is incorporated by reference herein in its entirety.

BACKGROUND

The present disclosure relates generally to information handling systems, and more particularly to a scalable Ethernet Bunch Of Flash (EBOF) storage system provided by and/or used by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, desktop computing devices, laptop/notebook computing devices, tablet computing device, mobile phones, and/or other computing devices known in the art, are often configured to store their data using storage systems connected via a Storage Area Network (SAN) or other network. One option for such SAN-connected storage systems includes Ethernet "Bunch Of Flash" (EBOF) storage systems that have been developed for use in disaggregated storage architectures. Conventional EBOF storage systems typically provide a plurality of Ethernet Non-Volatile Memory express (NVMe) Solid State Drive (SSD) storage devices connected via Ethernet links to an Ethernet switch chip, with the Ethernet switch chip connected to an EBOF Central Processing Unit (CPU) in the EBOF storage system, as well as to a plurality of physical Ethernet ports accessible on a surface of the EBOF storage system. As will be appreciated by one of skill in the art in possession of the present disclosure, conventional EBOF storage systems allow host devices to directly connect to any of its Ethernet NVMe SSD storage devices (e.g., any Ethernet NVMe SSD storage device(s) hosting namespace(s)/storage partitions that those host device are accessing) via its physical Ethernet ports and through its Ethernet switch chip.

As such, the Ethernet switch chip in conventional EBOF storage systems operates as a Layer 2 (L2) port aggregator that simply aggregates the relatively large number of internal connections to its Ethernet NVMe SSD storage devices and presents them as the relatively smaller number of external connections provided by its physical Ethernet ports. Furthermore, the Ethernet switch chip in conventional EBOF storage systems is "transparent" from a network point of view in that the host devices do not "see" the Ethernet switch chip as an NVMe entity, and rather those host devices "see" each of the plurality of Ethernet NVMe SSD storage devices in the EBOF storage system via their respective public Internet Protocol (IP) addresses and Direct Discovery Controllers (DDCs), which raises some issues.

For example, the exposure by EBOF storage systems of the public IP addresses of its Ethernet NVMe SSD storage devices (i.e., at least one IP address per Ethernet NVMe SSD storage device) presents relatively significant scaling issues for a SAN that includes the EBOF storage systems. As will be appreciated by one of skill in the art in possession of the present disclosure, a host device discovering conventional EBOF storage systems like those described above must discover a number of DDCs that is typically equal to the number of Ethernet NVMe SSD storage devices included in each of those EBOF storage systems. To provide a specific example in which each EBOF storage system includes 24 Ethernet NVMe SSD storage devices, each host device would be required to discover 72 DDCs in a SAN connected to 3 EBOF systems, 2400 DDCs in a SAN connected to 100 EBOF systems, and more DDCs in SANs that attempt to scale EBOF storage systems further.

Accordingly, it would be desirable to provide a scalable EBOF system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an Ethernet Bunch Of Flash (EBOF) management engine that is configured to: identify storage devices that are connected to the processing system and external physical interfaces that are connected to the processing system; identify a respective public IP address assigned to each of the external physical interfaces; assign a respective private Internet Protocol (IP) address to each of the storage devices, at least one private port identifier to the storage devices, and at least one respective public port identifier to each of the storage devices for one or more of the external physical interfaces; generate an EBOF Network Address Translation (NAT) table by mapping, for each storage device: each respective public IP address assigned to the external physical interfaces to the public port identifier assigned to that storage device for that external physical interface to provide an external physical interface public IP address/storage device public port combination for that storage device; the private IP address assigned to that storage device to the private port identifier assigned to that storage device to provide a private IP address/private port identifier combination for that storage device; and the private IP address/private port identifier combination for that storage device to the external physical interface public IP address/storage device public port combination for that storage device; and use the EBOF NAT table to transmit data packets between a host device and one or more of the storage devices.

BRIEF DESCRIPTION OF THE DRAWINGS

FIG. 5B is a flow chart illustrating an embodiment of a second portion of a method for providing a scalable EBOF storage system.

FIG. 6B is a schematic view illustrating an embodiment of an EBOF management database in the EBOF storage system of FIG. 6A operating during the method of FIGS. 5A and 5B.

FIG. 6C is a schematic view illustrating an embodiment of an EBOF management database in the EBOF storage system of FIG. 6A operating during the method of FIGS. 5A and 5B.

FIG. 12A is a schematic view illustrating an embodiment of an EBOF management database in the EBOF storage system of FIG. 6A operating during the method of FIG. 11.

FIG. 12B is a schematic view illustrating an embodiment of an EBOF management database in the EBOF storage system of FIG. 6A operating during the method of FIG. 11.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
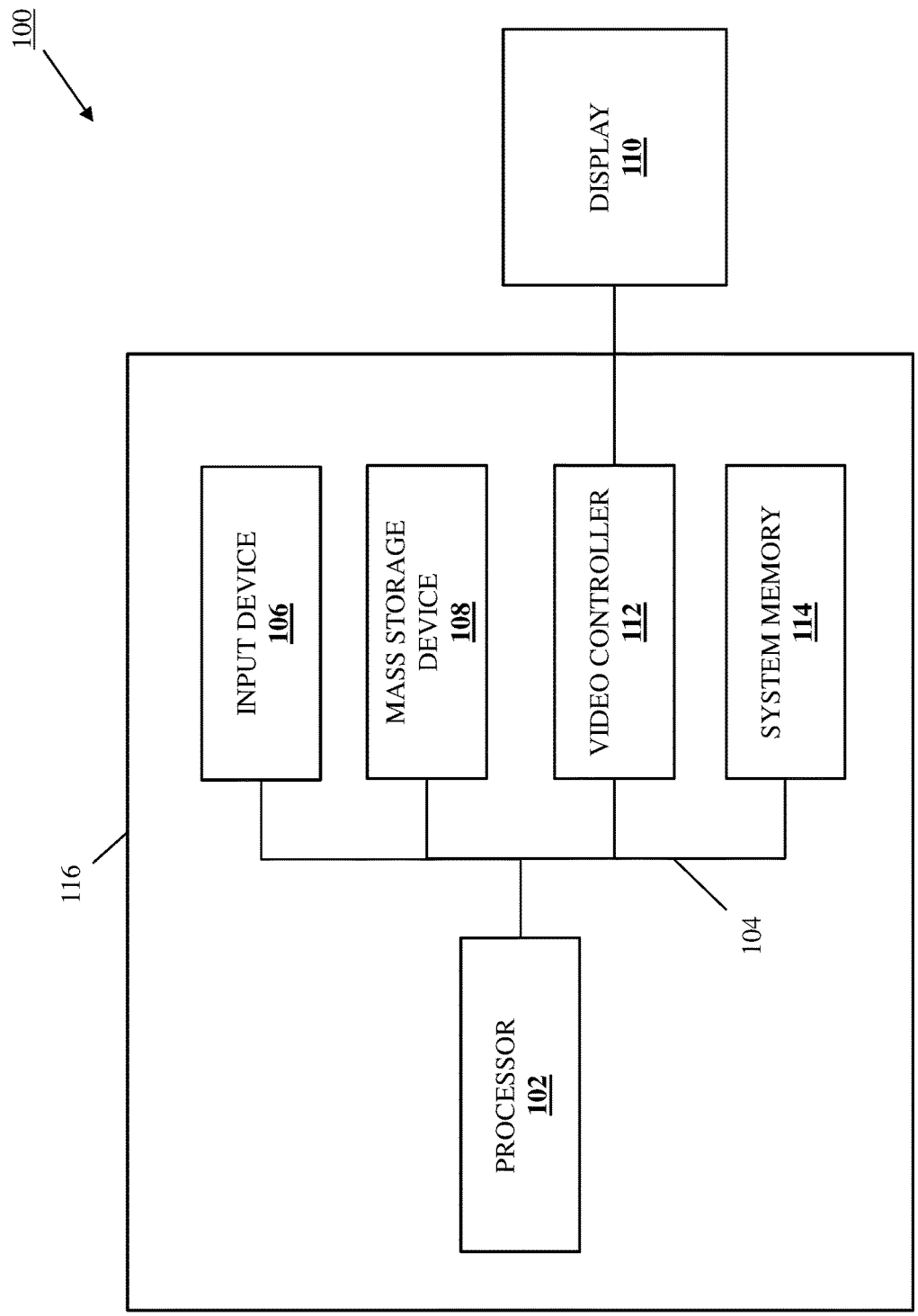
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
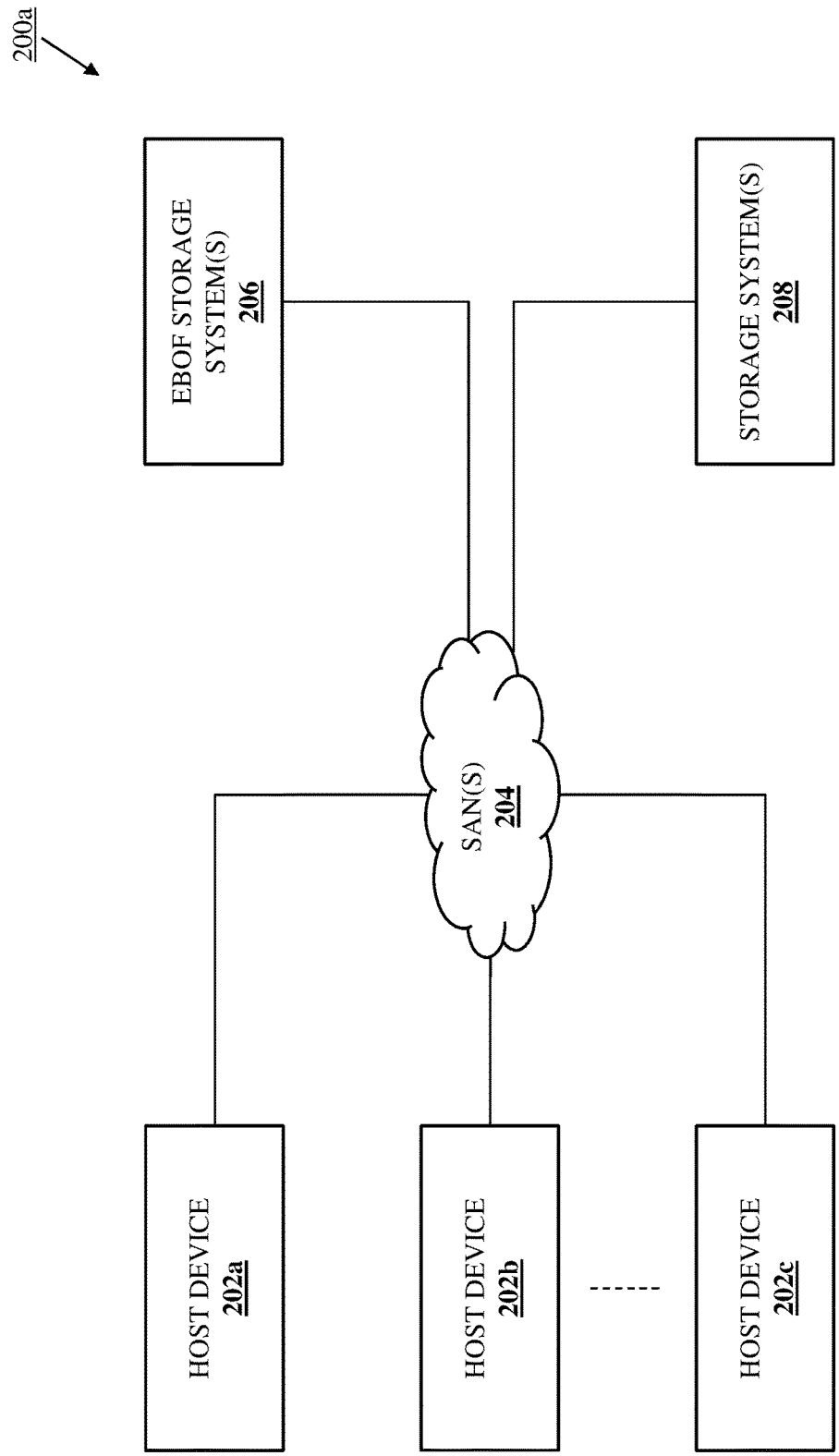
FIG. 2A is a schematic view illustrating an embodiment of a networked system that may include the scalable EBOF storage systems of the present disclosure.

Referring now to FIG. 2A, an embodiment of a networked system 200a is illustrated that may include the scalable EBOF storage system of the present disclosure. In the illustrated embodiment, the networked system 200a includes a plurality of host devices 202a, 202b, and up to 202c. In an embodiment, any or each of the host devices 202a-202c may be provided by the IHS 100 discussed above with reference to FIG. 1, and/or may include some or all of the components of the IHS 100, and in specific examples may be provided by server devices, desktop computing devices, laptop/notebook computing devices, tablet computing devices, mobile phones, and/or other host computing device that would be apparent to one of skill in the art in possession of the present disclosure. However, while illustrated and discussed as being provided by particular computing devices, one of skill in the art in possession of the present disclosure will recognize that host devices provided in the networked system 200a may include any devices that may be configured to operate similarly as the host devices 202a-202c discussed below.

In the illustrated embodiment, the host devices 202a-202c may be coupled to one or more Storage Area Networks (SANs) 204 that may be provided using any of a variety of SAN networking components that would be apparent to one of skill in the art in possession of the present disclosure. In the specific examples provided below, the SAN(s) 204 are described as a single SAN for simplicity, but as discussed below multiple SANs will fall within the scope of the present disclosure as well. In an embodiment, a plurality of storage systems are coupled to the SAN(s) 204, and in the illustrated embodiment are provided by one or more EBOF storage systems 206 and one or more other storage system(s) 208. In an embodiment, any or each of the storage systems in the networked system 200a may be provided by the IHS 100 discussed above with reference to FIG. 1, and/or may include some or all of the components of the IHS 100. However, while a specific networked system 200a has been illustrated and described, one of skill in the art in possession of the present disclosure will recognize that the networked system 200a of the present disclosure may include a variety of components and component configurations while remaining within the scope of the present disclosure as well.

Figure 2B:
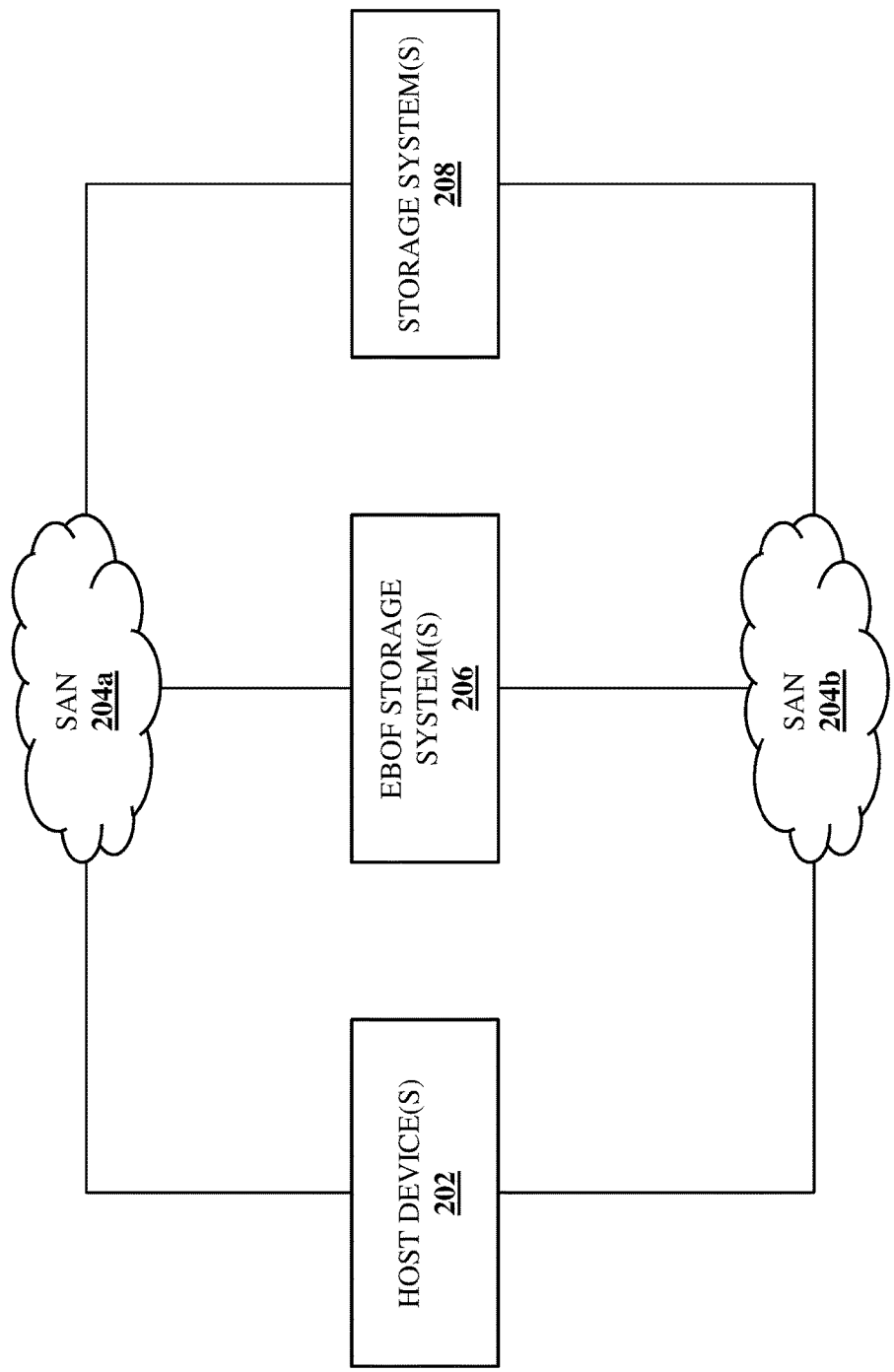
FIG. 2B is a schematic view illustrating an embodiment of a networked system that may include the scalable EBOF storage systems of the present disclosure.

With reference to FIG. 2B, an embodiment of a networked system 200b is illustrated that is similar to the networked system 200a discussed above with reference to FIG. 2A, with similar components provided with similar reference numbers. One of skill in the art in possession of the present disclosure will appreciate how the networked system 200b provides a specific example of the networked system 200a that includes redundant and/or load-balancing connections between the host devices 202 (which may include the host devices 202a-202c) and each of the EBOF storage systems(s) 206 and the storage system(s) 208. As such, the SAN(s) 204 discussed above with reference to FIG. 2A may include a pair of redundant/load-balancing SANs 204a and 204b in the networked system 200b that are each connected to each of the host devices 202, to each of the EBOF storage system(s) 206, and to each of the storage system(s) 208.

One of skill in the art in possession of the present disclosure will appreciate how the SANs 204a and 204b may be provided in an "active-active" configuration in which they operate independently from each other to provide redundant connections to for each host device 202 each of the EBOF storage system(s) 206 and each of the storage system(s) 208, load balancing for loads generated by each host device 202 for each of the EBOF storage system(s) 206 and each of the storage system(s) 208, as well as other benefits known in the art. As such, while the specific examples below describe the operation of the scalable EBOF storage system of the present disclosure using a single SAN in the networked system 200a, one of skill in the art in possession of the present disclosure will appreciate how the operations of the scalable EBOF storage system of the present disclosure discussed below may be extended to the pair of redundant/load-balancing SANs in the networked system 200b (or additional SANs) while remaining within the scope of the present disclosure as well.

Figure 3A:
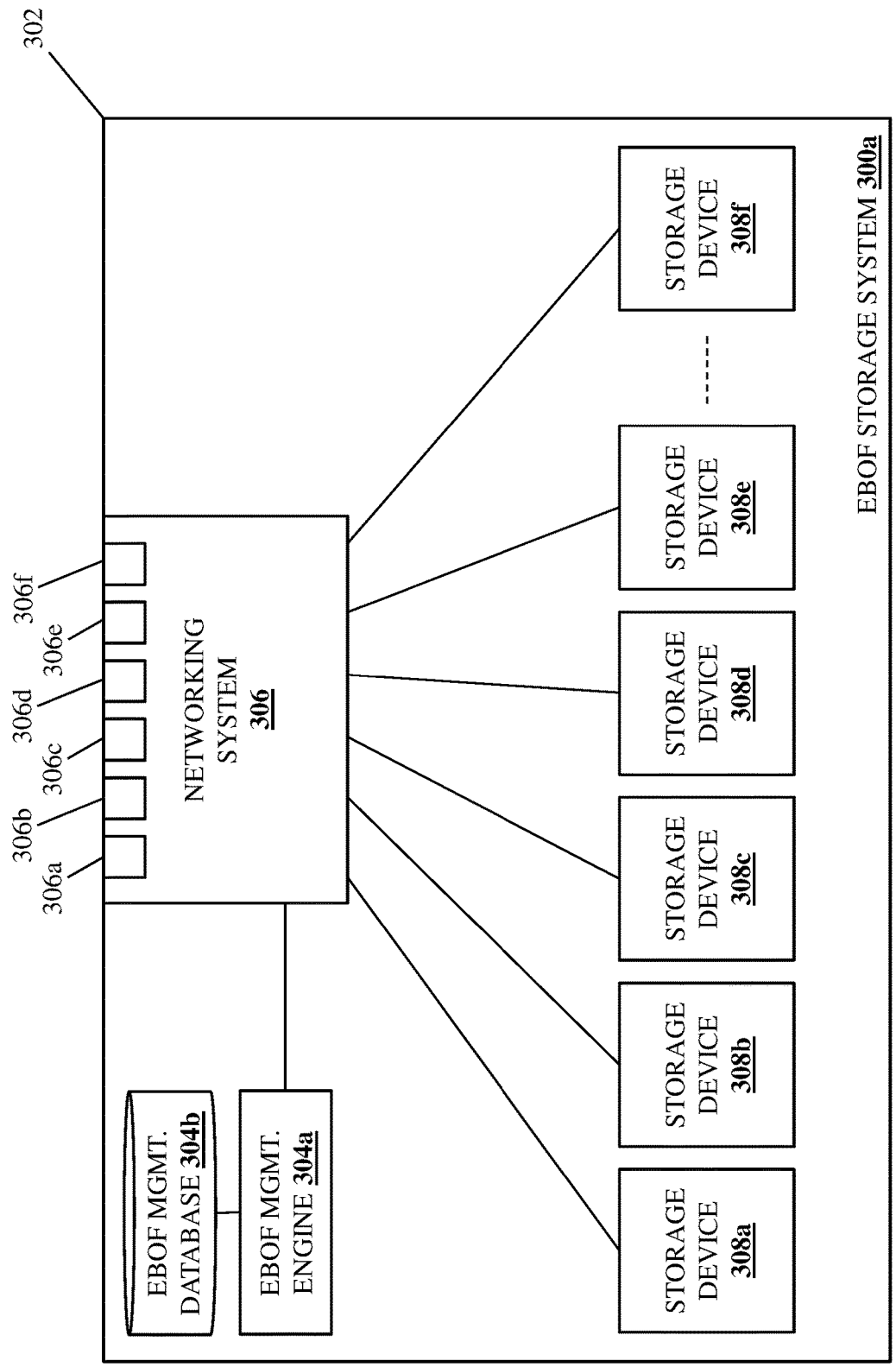
FIG. 3A is a schematic view illustrating an embodiment of a scalable EBOF storage system that may be included in the networked systems of FIGS. 2A and 2B and that may be provided according to the teachings of the present disclosure.

Referring now to FIG. 3A, an embodiment of a EBOF storage system 300a is illustrated that may provide any or each of the EBOF storage subsystem(s) 206 discussed above with reference to FIG. 2. As such, the EBOF storage system 300a may be provided by the IHS 100 discussed above with reference to FIG. 1 and/or may include some or all of the components of the IHS 100. Furthermore, while illustrated and discussed as being provided by an EBOF storage system, one of skill in the art in possession of the present disclosure will recognize that the functionality of the EBOF storage system 300a discussed below may be provided by other devices that are configured to operate similarly as the EBOF storage system 300a discussed below. In the illustrated embodiment, the EBOF storage system 300a includes a chassis 302 (e.g., a 1 rack unit (1 U) or 2 U chassis in a specific example) that houses the components of the EBOF storage system 300a, only some of which are illustrated and described below.

For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an EBOF management engine 304a that is configured to perform the functionality of the EBOF management engines and/or EBOF storage systems discussed below. In a specific example, the functionality of the EBOF management engine 304a described below may be provided by a central processing system (e.g., an EBOF Central Processing Unit (CPU)) and a networking processing system (e.g., an EBOF Ethernet switch chip), not illustrated, that each may be included in the chassis 302 of the EBOF storage system 300a. However, while a specific processing configuration for providing the EBOF management engine 304a is described herein, one of skill in the art in possession of the present disclosure will appreciate how the functionality of the EBOF management engine 304a may be provided in a variety of manners that will fall within the scope of the present disclosure as well.

The chassis 302 may also house a storage system (not illustrated, but which may include the storage 108 discussed above with reference to FIG. 1) that is coupled to the EBOF management engine 304a (e.g., via a coupling between the storage system and the processing system) and that includes an EBOF management database 304b that is configured to store any of the information utilized by the EBOF management engine 304a discussed below. The chassis 302 may also house a networking system 306 that, in the illustrated embodiment, is coupled to the EBOF management engine 304a. However, while illustrated as coupled to the EBOF management engine 304a, as discussed below the networking system 306 may include the networking processing system (e.g., the EBOF Ethernet switch chip) discussed above that may be utilized to provide at least some of the functionality of the EBOF management engine 304a.

As illustrated, the networking system 306 also includes a plurality of external physical interfaces 306a, 306b, 306c, 306d, 306e, and 306f that are accessible on a surface of the chassis 302 and that may be provided by physical Ethernet ports or other physical interfaces that one of skill in the art in possession of the present disclosure would recognize as being configured to connect to the SAN discussed above. In the specific examples provided below, the external physical interfaces 306a-306f are described as connecting to a single SAN for simplicity, but as discussed below the connection of the scalable EBOF storage system of the present disclosure to multiple SANs will fall within the scope of the present disclosure as well. In a specific example, the external physical interfaces 306a-306f may also be directly connected to an Ethernet switch chip in the EBOF storage system 300a. However, while 6 external physical interfaces are illustrated and described as being included on the EBOF storage system 300a, one of skill in the art in possession of the present disclosure will appreciate how more or fewer external physical interfaces may be provided on the EBOF storage system 300a while remaining within the scope of the present disclosure as well.

In the illustrated embodiment, chassis 302 may also house a plurality of storage devices 308a, 308b, 308c, 308d, 308e, and up to 308f. In a specific example, the EBOF storage system 300a may include 24 storage devices, although one of skill in the art in possession of the present disclosure will appreciate how more or fewer storage devices will fall within the scope of the present disclosure as well. In an embodiment, each of the storage devices may be provided by a Solid State Drive (SSD) storage device such as, for example, a Non-Volatile Memory express (NVMe) SSD storage device, although one of skill in the art in possession of the present disclosure will appreciate how other storage devices may benefit from the teachings of the present disclosure as thus will fall within its scope as well. As illustrated, each of the storage devices 308a-308f may be connected to the networking system 306 via a respective Ethernet connection (e.g., an Ethernet link provided by circuit board traces, cabling, and/or other Ethernet connections known in the art) to the networking system 306.

As such, in a specific example, each storage device 308a-308f may be directly connected to "internal" physical Ethernet interfaces on an Ethernet switch chip in the EBOF storage system 300a, with the Ethernet switch chip also connected to a smaller number of "external" physical Ethernet interfaces that are relatively higher speed interfaces than the "internal" physical Ethernet interface. However, while a specific EBOF storage system 300a has been illustrated and described, one of skill in the art in possession of the present disclosure will recognize that EBOF storage systems (or other devices operating according to the teachings of the present disclosure in a manner similar to that described below for the EBOF storage system 300a) may include a variety of components and/or component configurations for providing conventional EBOF storage system functionality, as well as the functionality discussed below, while remaining within the scope of the present disclosure as well.

Figure 3B:
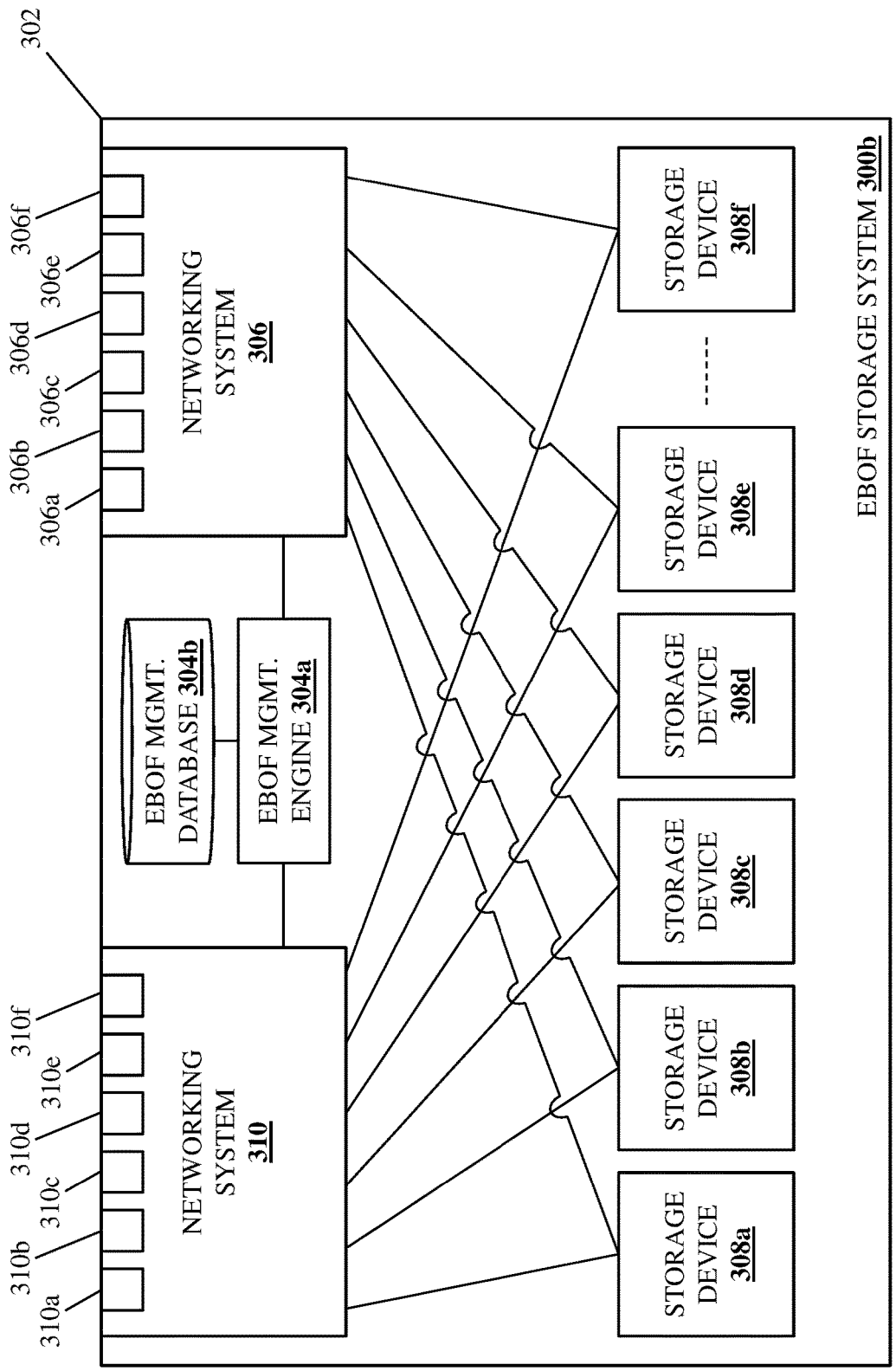
FIG. 3B is a schematic view illustrating an embodiment of a scalable EBOF storage system that may be included in the networked systems of FIGS. 2A and 2B and that may be provided according to the teachings of the present disclosure.

With reference to FIG. 3B, an embodiment of an EBOF storage system 300b is illustrated that is similar to the EBOF storage system 300a discussed above with reference to FIG. 3A, with similar components provided with similar reference numbers. As will be appreciated by one of skill in the art in possession of the present disclosure, the EBOF storage system 300b provides a specific example of the EBOF storage system 300a that includes redundant and/or load-balancing connections to different SANs. In the illustrated example, the chassis 302 also houses a networking system 310 that may be configured and may operate substantially similarly to the networking system 306 discussed above. As such, in the illustrated embodiment, the networking system 310 is coupled to the EBOF management engine 304a. However, similarly as described for the networking system 306, while illustrated as coupled to the EBOF management engine 304a, the networking system 310 may include the networking processing system (e.g., the EBOF Ethernet switch chip) discussed above that may be utilized to provide at least some of the functionality of the EBOF management engine 304a.

As also illustrated, the networking system 310 also includes a plurality of external physical interfaces 310a, 310b, 310c, 310d, 310e, and 310f that are similar to the external physical interfaces 306a-368f and thus are accessible on a surface of the chassis 302 and may be provided by physical Ethernet ports or other physical interfaces that would one of skill in the art in possession of the present disclosure would recognize as being configured to connect to one of the SANs discussed above. Also similarly to the networking system 306, the external physical interfaces 310a-310f may be directly connected to an Ethernet switch chip in the EBOF storage system 300a, and each of the storage devices 308a-308f may be connected to the networking system 310 via a respective Ethernet connection (e.g., an Ethernet link provided by circuit board traces, cabling, and/or other Ethernet connections known in the art). As will be appreciated by one of skill in the art in possession of the present disclosure, the networking system 306 may be connected to a first SAN (e.g., the SAN 204a discussed above with reference to FIG. 2B) via its external physical interfaces 306a-306f, while the networking system 310 may be connected to a second SAN (e.g., the SAN 204b discussed above with reference to FIG. 2B) via its external physical interfaces 310a-310f, with the networking systems 306 and 310 operating in an "active-active" configuration in order to provide redundant/load-balancing connections to any host devices connected to those SANs as well.

Thus, while the specific examples below describe the operation of EBOF storage system 300a to provide the scalable EBOF storage system of the present disclosure using a single SAN 204 in the networked system 200a, one of skill in the art in possession of the present disclosure will appreciate how the operation of the EBOF storage system 300a/networked system 200a discussed below may be extended to the EBOF storage system 200b with its networking systems 306 and 310 connected to the pair of redundant/load-balancing SANs 204a and 204b, respectively, in the networked system 200b (and with each of those networking systems 306 and 310 operating similarly as described for the networking system 306 in the EBOF storage system 300a connected to the SAN 204 in the networked system 200a discussed below) while remaining within the scope of the present disclosure as well.

Figure 4:
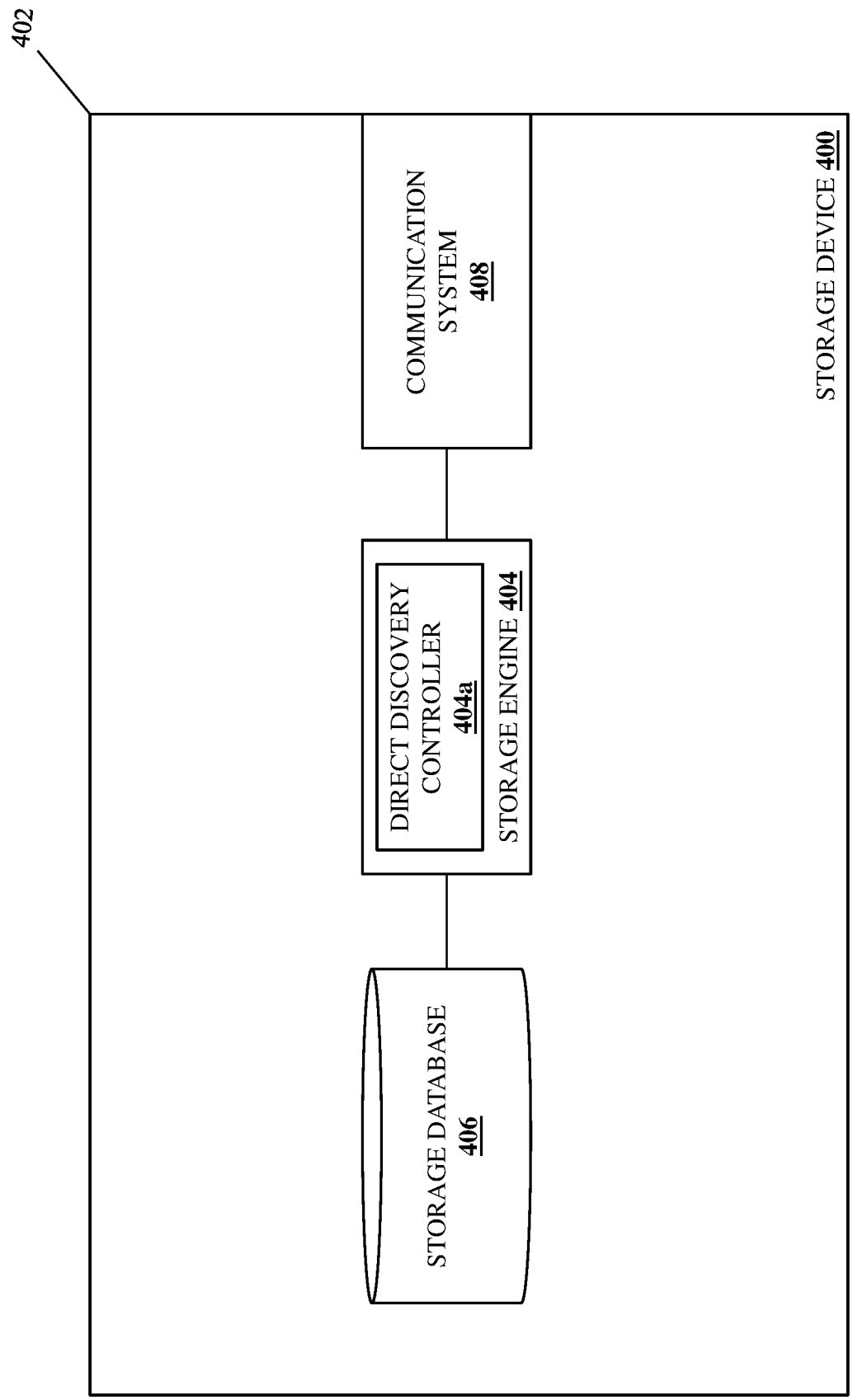
FIG. 4 is a schematic view illustrating an embodiment of a storage device that may be include in the scalable EBOF storage systems of FIGS. 3A and 3B.

Referring now to FIG. 4, an embodiment of a storage device 400 is illustrated that may provide any or each of the storage devices 308a-308f discussed above with reference to FIGS. 3A and 3B. As such, the storage device 400 may be provided by an NVMe SSD storage device, although other types of storage devices may benefit from the teachings of the present disclosure and thus will fall within its scope as well. In the illustrated embodiment, the storage device 400 includes a chassis 402 that houses the components of the storage device 400, only some of which are illustrated and discussed below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a storage engine 404 that is configured to perform the functionality of the storage engines and/or storage devices discussed below. In the specific example illustrated in FIG. 4, the storage engine 404 is configured to provide a Direct Discovery Controller (DDC) 404a that is configured to perform the DDC functionality described below, but one of skill in the art in possession of the present disclosure will appreciate how they storage engine 404 may perform a variety of other functionality while remaining within the scope of the present disclosure as well.

The chassis 402 may also house a storage system (not illustrated, but which may include the storage 108 discussed above with reference to FIG. 1) that is coupled to the storage engine 404 (e.g., via a coupling between the storage system and the processing system) and that includes a storage database 406 that is configured to store any of the information utilized by the storage engine 404 discussed below. The chassis 402 may also house a communication system 408 that is coupled to the storage engine 404 (e.g., via a coupling between the communication system 408 and the processing system) and that may be provided by any of a variety of storage communication components that would be apparent to one of skill in the art in possession of the present disclosure. However, while a specific storage device 400 has been illustrated and described, one of skill in the art in possession of the present disclosure will recognize that storage devices (or other devices operating according to the teachings of the present disclosure in a manner similar to that described below for the storage device 400) may include a variety of components and/or component configurations for providing conventional storage device functionality, as well as the functionality discussed below, while remaining within the scope of the present disclosure as well.

Figure 5A:
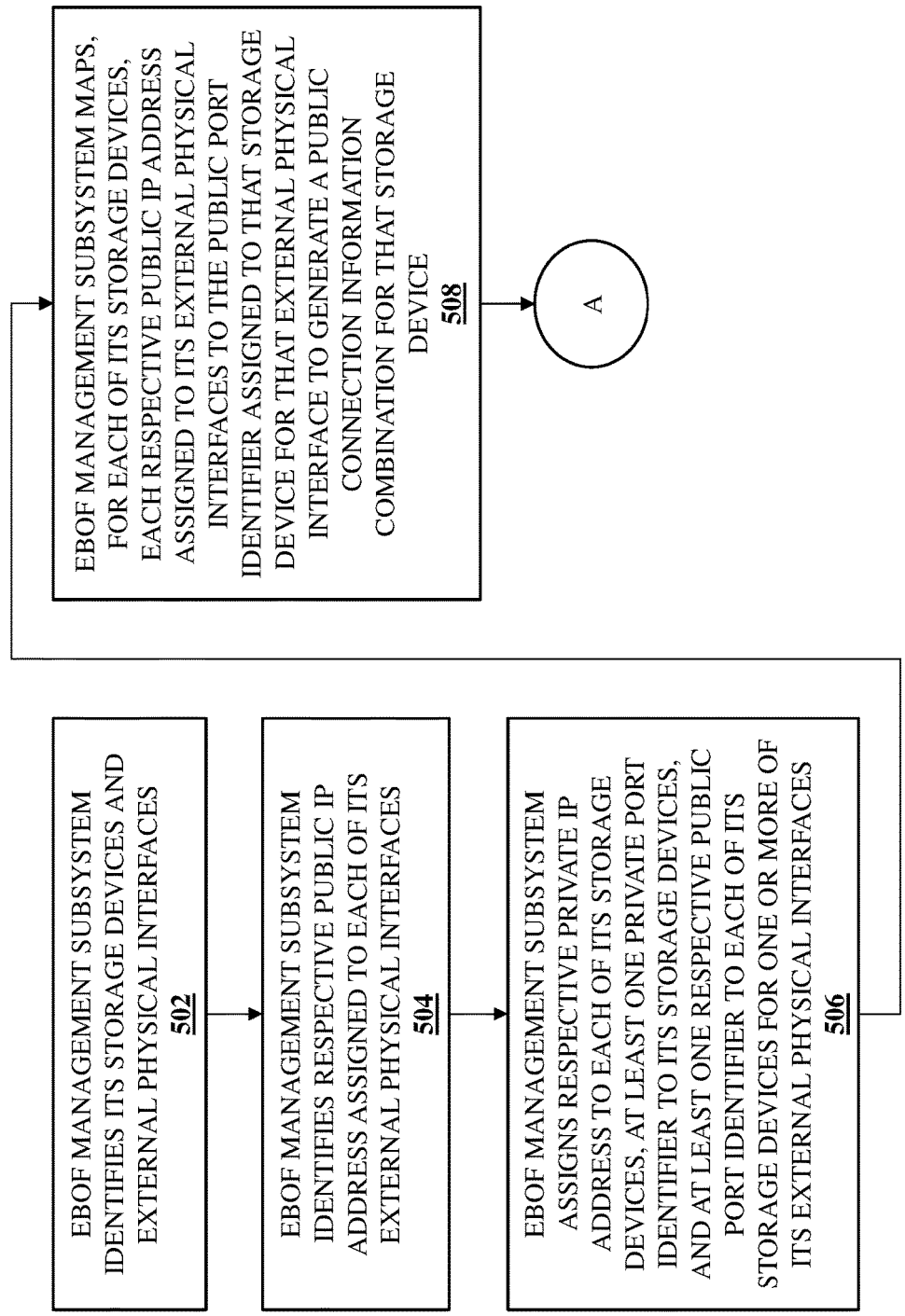
FIG. 5A is a flow chart illustrating an embodiment of a first portion of a method for providing a scalable EBOF storage system.

Referring now to FIGS. 5A and 5B, an embodiment of a method 500 for providing a scalable Ethernet Bunch Of Flash (EBOF) storage system is illustrated. As discussed below, the systems and methods of the present disclosure provide for the generation of an EBOF NAT table that allows an EBOF storage system to present a relatively small number of "front-end" public IP addresses associated with its external physical interfaces for use in accessing its storage devices via a relatively larger number of internal/"back-end" private IP addresses associated with those storage devices. For example, the scalable EBOF storage system of the present disclosure may identify its storage devices and external physical interfaces, and respective public IP addresses assigned to each external physical interface. The scalable EBOF storage system assigns a respective private IP address to each storage device, respective public port identifier(s) to each storage device, and private port identifier(s) to the storage devices. The scalable EBOF storage system then generates an EBOF NAT table by mapping, for each storage device: each respective public IP address assigned to the external physical interfaces to the public port identifier assigned to that storage device to provide a public connection information combination for that storage device, the private IP address assigned to that storage device to the private port identifier assigned to that storage device to provide a private information connection combination for that storage device, and the public information connection combination to the private information connection combination for that storage device. As such, scalability of EBOF storage systems connected to SANs is enabled by reducing the number of connections required by host devices to access storage devices in those EBOF storage systems.

Figure 6A:
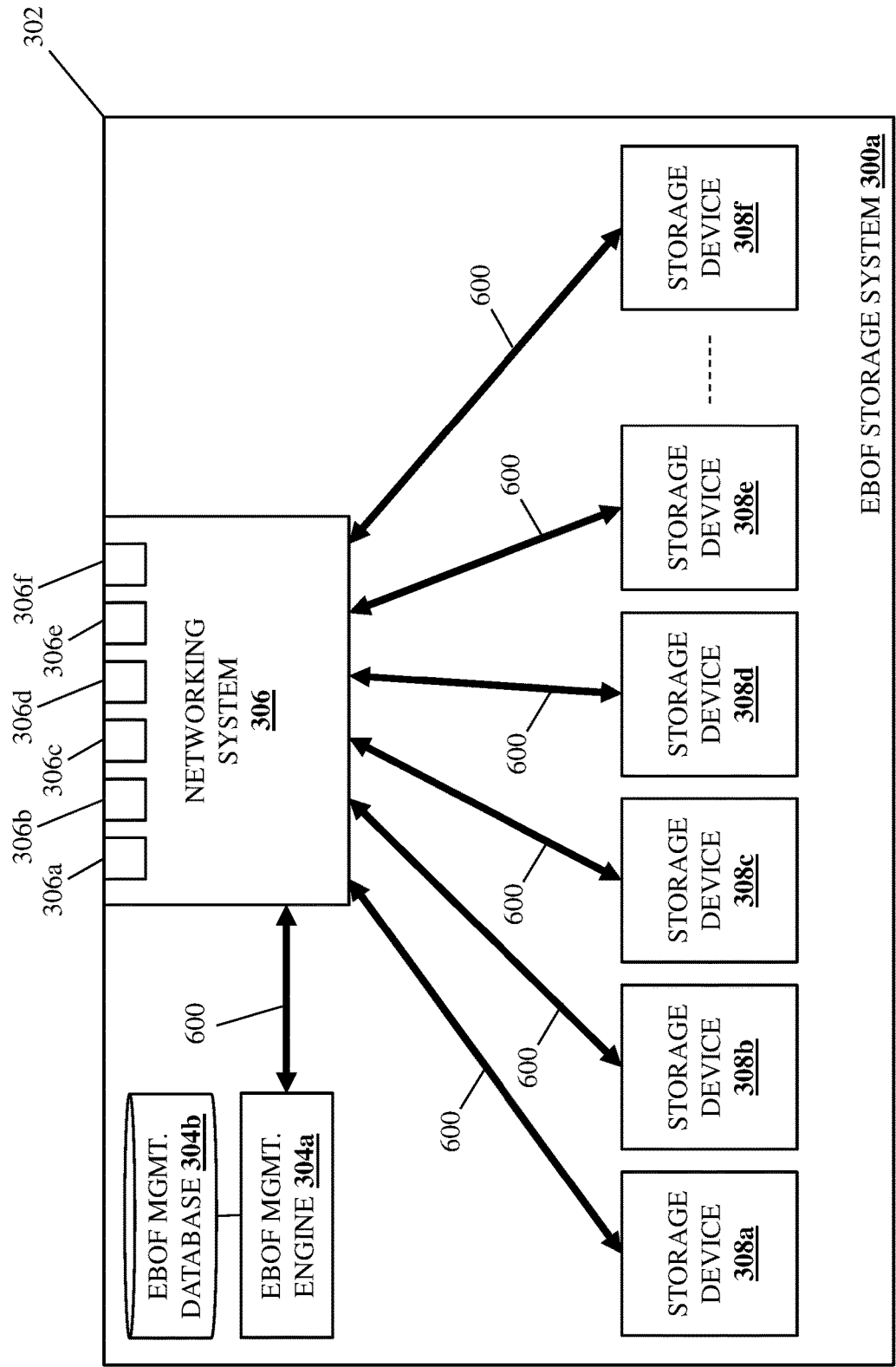
FIG. 6A is a schematic view illustrating an embodiment of the EBOF storage system of FIG. 3A operating during the method of FIGS. 5A and 5B.

The method 500 begins at block 502 where an EBOF management subsystem identifies its storage devices and external physical interfaces. With reference to FIGS. 6A and 6B, in an embodiment of block 502, the EBOF management engine 304a in the EBOF storage system 300a (e.g., provided by the EBOF CPU discussed above) included in the networked system 200a may perform EBOF storage system configuration identification operations 600 that may include identifying each of the storage devices 308a-308f included in the EBOF system 300a, identifying each of the external physical interfaces 306a-306f that are connected to the SAN 204 (a single SAN in this specific example), as well as any other configuration information that one of skill in the art in possession of the present disclosure would recognize as allowing for the functionality described below. In a specific example, the EBOF storage system 300a may include a plurality of storage device slots, any of which may be populated by one of the storage devices 308a-308f, and thus the identification of the storage devices 308a-308f may identify the populated storage device slots. As will be appreciated by one of skill in the art in possession of the present disclosure, the external physical interfaces 306a-306f and the storage device 308a-308f may be identified using any interface and storage device identification information known in the art.

As discussed below, the EBOF storage system configuration information obtained during the EBOF storage system configuration identification operations 600 may be used to generate an EBOF NAT table, and one of skill in the art in possession of the present disclosure will appreciate how some embodiments of the EBOF storage system configuration identification operations 600 may be performed at block 502 during boot, reset, or other initialization of the EBOF storage system 300a, as the EBOF NAT table discussed below is based on the internal configuration of the EBOF storage system 300a (e.g., the number of storage devices present in the storage device slots of the EBOF storage system 300a). However, one of skill in the art in possession of the present disclosure will also appreciate how other embodiments of the EBOF storage system configuration identification operations 600 may be performed periodically (during reset, reboot, or other subsequent initialization of the EBOF storage system 300a, during runtime of the EBOF storage system 300a, etc.) for use in updating the EBOF NAT table in the event of, for example, a change to the internal configuration of the EBOF storage system 300a (e.g., the addition and/or removal of storage devices).

The method 500 then proceeds to block 504 where the EBOF management subsystem identifies respective public IP addresses assigned to each of its external physical interfaces. In an embodiment, at block 504, the EBOF management engine 304a in the EBOF storage system 300a (e.g., provided by the EBOF CPU discussed above) included in the networked system 200a may perform external physical interface public IP address identification operations that may include identifying a respective public IP address that was assigned to each of the external physical interfaces 306a-306f on the networking system 306. For example, and as will be appreciated by one of skill in the art in possession of the present disclosure, a network administrator or other user of the EBOF storage system 300a may assign a respective "public" IP address (e.g., IP addresses used by the host devices 202a-202c to transmit data packets to the storage devices 308a-308f, discussed below) to each of the external physical interfaces 306a-306f on the networking system 306 in the EBOF storage system 300a, and the EBOF management engine 304a may use any of a variety of IP address identification techniques known in the art in order to identify each of those public IP addresses.

The method 500 then proceeds to block 506 where the EBOF management subsystem assigns a respective private IP address to each of its storage devices, at least one private port identifier to its storage devices, and at least one respective public port identifier to each of its storage devices for one or more of its external interfaces. In an embodiment, at block 506, the EBOF management engine 304a in the EBOF storage system 300a (e.g., provided by the EBOF CPU discussed above) included in the networked system 200a may perform storage device private IP address assignment operations that may include assigning a respective private IP address to each of the storage devices 308a-308f. As will be appreciated by one of skill in the art in possession of the present disclosure, the "private" IP addresses assigned to the storage devices 308a-308f at block 506 may be used by the EBOF Ethernet switch chip discussed above to provide storage connections (e.g., Transmission Control Protocol (TCP) connections for NVMe/TCP, User Datagram Protocol (UDP) connections for NVMe/Remote Direct Memory Access (RDMA) over Converged Ethernet (RoCE), etc.) that allow it to transmit data packet to the storage devices 308a-308f.

To provide a specific example, the EBOF CPU providing the EBOF management engine 304a may provide a Dynamic Host Configuration Protocol (DHCP) server that is configured to dynamically assign the respective private IP addresses to each of the storage devices 308a-308f at block 506. In another specific example, the EBOF CPU providing the EBOF management engine 304a may use a table of static IP addresses stored in the EBOF management database 304b to assign the respective private IP addresses to each of the storage devices 308a-308f at block 506. However, while specific examples have been described, one of skill in the art in possession of the present disclosure will appreciate how private IP addresses may be assigned to the storage devices 308a-308f using a variety of techniques that will fall within the scope of the present disclosure as well.

In an embodiment, at block 506, the EBOF management engine 304a in the EBOF storage system 300a (e.g., provided by the EBOF CPU discussed above) included in the networked system 200a may also perform storage device private port identifier assignment operations that may include assigning at least one respective "private" port identifier to the storage devices 308a-308f. As will be appreciated by one of skill in the art in possession of the present disclosure, the "private" port identifier(s) assigned to the storage devices 308a-308f at block 506 may be provided by Layer 4 (L4) port identifiers for L4 ports used by the EBOF Ethernet switch chip discussed above to provide storage connections (e.g., TCP connections for NVMEe/TCP, UDP connections for NVMe/RoCE, etc.) that allow it to transmit data packet to the storage devices 308a-308f.

In the specific simplified examples discussed below, the EBOF CPU providing the EBOF management engine 304a may assign the default NVMe port identifier "4420" for the default NVMe port as the private port identifier to each of the storage devices 308a-308f, but as also discussed below, the assignment of a different private port identifier to each of the storage devices 308a-308f will fall within the scope of the present disclosure as well. However, while specific examples have been described, one of skill in the art in possession of the present disclosure will appreciate how private port identifiers may be assigned to the storage devices 308a-308f using a variety of techniques that will fall within the scope of the present disclosure as well.

In an embodiment, at block 506, the EBOF management engine 304a in the EBOF storage system 300a (e.g., provided by the EBOF CPU discussed above) included in the networked system 200a may also perform storage device public port identifier assignment operations that may include assigning at least one respective "public" port identifier to each of the storage devices 308a-308f for one or more of the external interfaces 306a-306f on the networking system 306. As will be appreciated by one of skill in the art in possession of the present disclosure, the respective "public" port identifier(s) assigned to the storage devices 308a-308f for one or more of the external interfaces 306a-306f at block 506 may be provided by L4 port identifiers for L4 ports used by the EBOF CPU to map the private IP addresses assigned to the storage devices 308a-308f to the public IP addresses assigned to the external physical interfaces 306a-306f to provide the EBOF NAT table discussed in further detail below.

The method then proceeds to blocks 508, 510, and 512 where the EBOF management engine 304a in the EBOF storage system 300a (e.g., provided by the EBOF CPU discussed above) included in the networked system 200a generates an EBOF Network Address Translation (NAT) table via a variety of mapping operations. As will be appreciated by one of skill in the art in possession of the present disclosure, the scalable EBOF storage system of the present disclosure leverages NAT techniques that are conventionally utilized in home networks to transmit data between client devices that have private IP addresses and that initiate connections with server devices that have public IP addresses and that response to such connections. However, one of skill in the art in possession of the present disclosure will also appreciate how the generation of the EOF NAT table discussed below requires different techniques when the storage devices 308a-308f (which may be considered similar to the server devices discussed above) have private IP addresses and the host devices 202a-202c (which may be considered similar to the client devices discussed above) have public IP addresses.

With reference to FIG. 6B, an embodiment of an EBOF NAT table 602a is illustrated that may be generated in response to the performance of blocks 508, 510, and 512 of the method 500, and while each of those blocks are described in order below with reference to the EBOF NAT table 602a, one of skill in the art in possession of the present disclosure will appreciate how the generation of the EBOF NAT table 602a may require performance of each of the blocks 508, 510, and 512 prior to being provided as illustrated in FIG. 6B.

Figure 7:
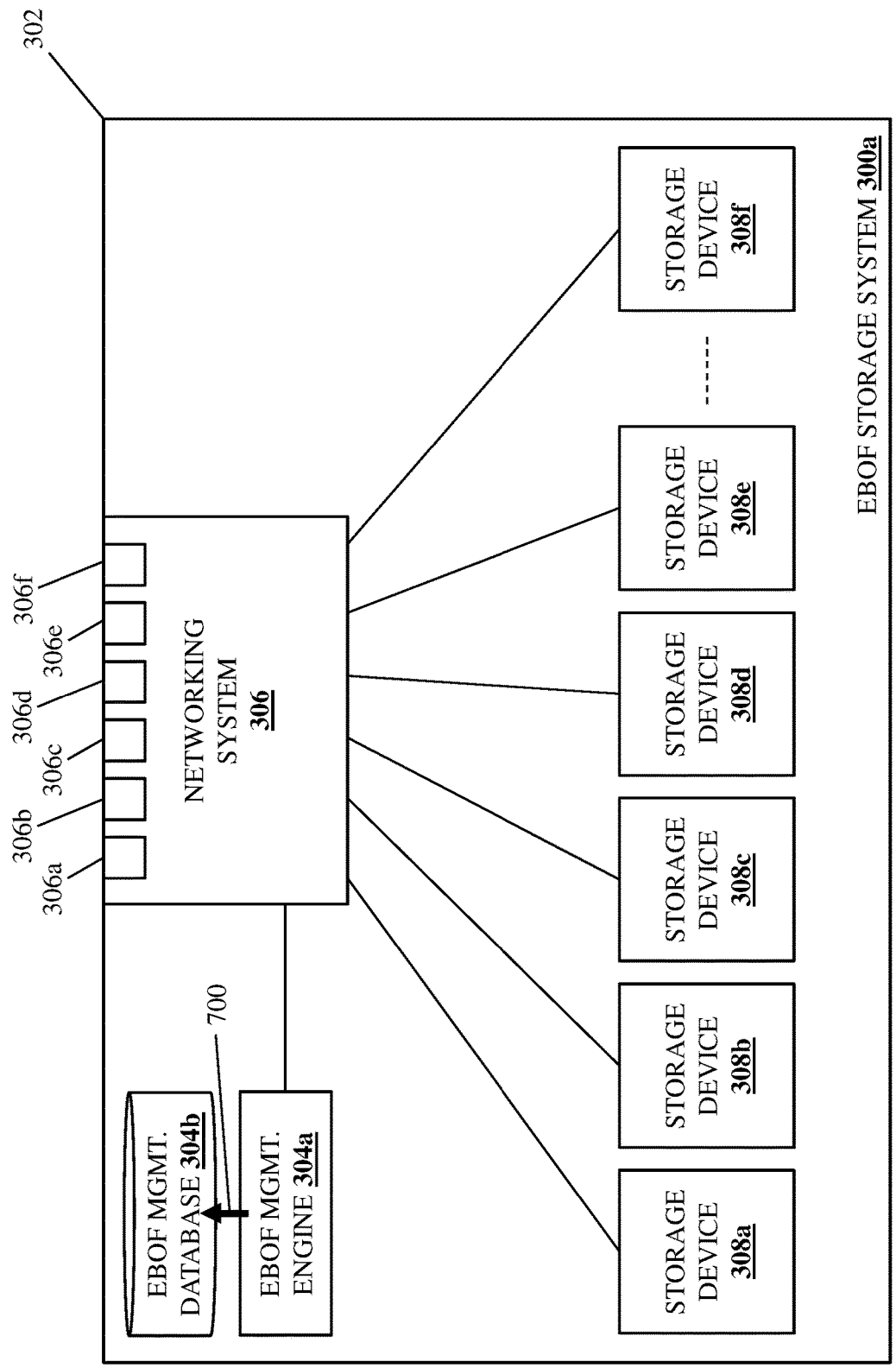
FIG. 7 is a schematic view illustrating an embodiment of the EBOF storage system of FIG. 3A operating during the method of FIGS. 5A and 5B.

As such, in an embodiment of block 508 and as part of generating the EBOF NAT table 602a, the EBOF management subsystem may map, for each of its storage devices, each respective public IP address assigned to its external physical interfaces to the public port identifier assigned to that storage device for that external physical interface to generate an external physical interface public IP address/storage device public port combination (referred to as a "public connection information combination" below) for that storage device. For example, with reference to FIGS. 6B and 7 and an embodiment of block 508, the EBOF management engine 304a in the EBOF storage system 300a (e.g., provided by the EBOF CPU discussed above) included in the networked system 200a may perform mapping operations 700 that may include mapping, in the EBOF management database 304b for the storage device 308a, the public IP addresses assigned to each of its external physical interfaces 306a-306f (e.g., "$IP_{306a}$, $IP_{306b}$, . . . $IP_{306f}$") to the public port identifier assigned to the storage device 308a for that external interface (e.g., "$Port_{306a}(308a)$, Port$_{306b}$(308a), . . . Port$_{306f}$(308a)") to provide the public connection information combination for the storage device 308a in the "PUBLIC ADDRESS/PORT" column for the storage device 308a row in the EBOF NAT table 602a (e.g., "IP$_{306a}$, Port$_{306a}$(308a)"; "IP$_{306b}$, Port$_{306b}$(308a)"; . . . "IP$_{306f}$, Port$_{306f}$(308a)").

Similarly, in an embodiment of block 508, the EBOF management engine 304a in the EBOF storage system 300a (e.g., provided by the EBOF CPU discussed above) included in the networked system 200a may perform the mapping operations 700 that may include mapping, in the EBOF management database 304b for the storage device 308b, the public IP addresses assigned to each of its external physical interfaces 306a-306f (e.g., "IP$_{306a}$, IP$_{306b}$, . . . IP$_{306f}$") to the public port identifier assigned to the storage device 308b for that external interface (e.g., "Port$_{306a}$(308b), Port$_{306b}$(308b), . . . Port$_{306f}$(308b)") to provide the public connection information combination for the storage device 308b in the "PUBLIC ADDRESS/PORT" column for the storage device 308b row in the EBOF NAT table 602a (e.g., "IP$_{306a}$, Port$_{306a}$(308b)"; "IP$_{306b}$, Port$_{306b}$(308b)"; . . . "IP$_{306f}$, Port$_{306f}$(308b)").

Similarly as well, in an embodiment of block 508, the EBOF management engine 304a in the EBOF storage system 300a (e.g., provided by the EBOF CPU discussed above) included in the networked system 200a may perform similar mappings for the rest of the storage devices 308c, 308d, 308e and up to 308f such that, as illustrated for the storage device 308f, it performs the mapping operations 700 that may include mapping, in the EBOF management database 304b, the public IP addresses assigned to each of its external physical interfaces 306a-306f (e.g., "IP$_{306a}$, IP$_{306b}$, . . . IP$_{306f}$") to the public port identifier assigned to the storage device 308f for that external interface (e.g., "Port$_{306a}$(308f), Port$_{306b}$(308f), . . . Port$_{306f}$(308f)") to provide the public connection information combination for the storage device 308f in the "PUBLIC ADDRESS/PORT" column for the storage device 308f row in the EBOF NAT table 602a (e.g., "IP$_{306a}$, Port$_{306a}$(308f)"; "IP$_{306b}$, Port$_{306b}$(308f)"; . . . "IP$_{306f}$, Port$_{306f}$(308f)").

In an embodiment of block 510 and as part of generating the EBOF NAT table 602a, the EBOF management subsystem may map, for each of its storage devices, the private IP address assigned to that storage device to the private port identifier assigned to that storage device to generate a private IP address/private port identifier combination (referred to as a "private connection information combination" below) for that storage device. For example, with reference to FIG. 6B and an embodiment of block 508, the EBOF management engine 304a in the EBOF storage system 300a (e.g., provided by the EBOF CPU discussed above) included in the networked system 200a may perform the mapping operations 700 that may include mapping, in the EBOF management database 304b for the storage device 308a, the private IP address assigned to the storage device 308a (e.g., "IP$_{308a}$") to the private port identifier assigned to the storage device 308a (e.g., "PORT$_{308a}$") to provide the private connection information combination for the storage device 308a in the "PRIVATE ADDRESS/PORT" column for the storage device 308a row in the EBOF NAT table 602a (e.g., "IP$_{308a}$, PORT$_{308a}$")

Similarly, in an embodiment of block 510, the EBOF management engine 304a in the EBOF storage system 300a (e.g., provided by the EBOF CPU discussed above) included in the networked system 200a may perform the mapping operations 700 that may include mapping, in the EBOF management database 304b for the storage device 308b, the private IP address assigned to the storage device 308b (e.g., "IP$_{308b}$") to the private port identifier assigned to the storage device 308b (e.g., "PORT$_{308b}$") to provide the private connection information combination for the storage device 308b in the "PRIVATE ADDRESS/PORT" column for the storage device 308b row in the EBOF NAT table 602a (e.g., "IP$_{308b}$, PORT$_{308b}$").

Similarly as well, in an embodiment of block 510, the EBOF management engine 304a in the EBOF storage system 300a (e.g., provided by the EBOF CPU discussed above) included in the networked system 200a may perform similar mappings for the rest of the storage devices 308c, 308d, 308e and up to 308f such that, as illustrated for the storage device 308f, it performs the mapping operations 700 that may include mapping, in the EBOF management database 304b, the private IP address assigned to the storage device 308f (e.g., "IP$_{308f}$") to the private port identifier assigned to the storage device 308f (e.g., "PORT$_{308f}$") to provide the private connection information combination for the storage device 308f in the "PRIVATE ADDRESS/PORT" column for the storage device 308f row in the EBOF NAT table 602a (e.g., "IP$_{308f}$, PORT$_{308f}$").

In an embodiment of block 512 and as part of generating the EBOF NAT table 602a, the EBOF management subsystem may map, for each of its storage devices, the private connection information combination for that storage device to the public connection information combination for that storage device in an EBOF NAT table. For example, with reference to FIG. 6B and an embodiment of block 508, the EBOF management engine 304a in the EBOF storage system 300a (e.g., provided by the EBOF CPU discussed above) included in the networked system 200a may perform the mapping operations 700 that may include mapping, in the EBOF management database 304b for the storage device 308a, the private connection information combination (e.g., "IP$_{308a}$, PORT$_{308a}$") for the storage device 308a to the public connection information combination (e.g., "IP$_{306a}$, PORT$_{306a}$(308a); IP$_{306b}$, PORT$_{306b}$(308a); . . . IP$_{306f}$, PORT$_{306f}$(308a)") for the storage device 308a to provide the EBOF NAT table entry for the storage device 308a in the EBOF NAT table 602a.

Similarly, in an embodiment of block 512, the EBOF management engine 304a in the EBOF storage system 300a (e.g., provided by the EBOF CPU discussed above) included in the networked system 200a may perform the mapping operations 700 that may include mapping, in the EBOF management database 304b for the storage device 308b, the private connection information combination (e.g., "IP$_{308b}$, PORT$_{308b}$") for the storage device 308b to the public connection information combination (e.g., "IP$_{306a}$, PORT$_{306a}$(308b); IP$_{306b}$, PORT$_{306b}$(308b); . . . IP$_{306f}$, PORT$_{306f}$(308b)") for the storage device 308b to provide the EBOF NAT table entry for the storage device 308b in the EBOF NAT table 602a.

Similarly as well, in an embodiment of block 512, the EBOF management engine 304a in the EBOF storage system 300a (e.g., provided by the EBOF CPU discussed above) included in the networked system 200a may perform similar mappings for the rest of the storage devices 308c, 308d, 308e and up to 308f such that, as illustrated for the storage device 308f, it performs the mapping operations 700 that may include mapping, in the EBOF management database 304b, the private connection information combination (e.g., "IP$_{308f}$, PORT$_{308f}$") for the storage device 308b to the public connection information combination (e.g., "IP$_{306a}$, PORT$_{306a}$(308f); IP$_{306b}$, PORT$_{306b}$(308f); . . . IP$_{306f}$, PORT$_{306f}$(308f)") for the storage device 308f to provide the EBOF NAT table entry for the storage device 308f in the EBOF NAT table 602a. However, while a specific example of an EBOF NAT table 602a has been illustrated and described, one of skill in the art in possession of the present disclosure will appreciate how EBOF NAT tables provided according to the teachings of the present disclosure in different manners while remaining within the scope of the present disclosure as well.

For example, with reference to FIG. 6C, an EBOF NAT table 602b is illustrated that may be provided similarly to the EBOF NAT table 602a but with a few simplifying assumptions. For example, it may be assumed that each of the storage devices 308a-308f provide storage services via the same private port (e.g., the default NVMe port with the port identifier "4420" discussed above, identified as "PORT" in the EBOF NAT table 602b). Furthermore, it may be assumed that any particular one of the storage devices 308a-308f is mapped to the same port identifier for all of the external physical interfaces 306a-306f (e.g., "PORT(308a)" for the storage device 308a, "PORT(308b)" for the storage device 308b, and up to "PORT(308f)" for the storage device 308f in the EBOF NAT table 602b). As such, the EBOF NAT table entry for the storage device 308a in the EBOF NAT table 602b includes its private connection information combination (e.g., "IP$_{308a}$, PORT") mapped to its public connection information combination (e.g., "IP$_{306a}$, PORT(308a); IP$_{306b}$, PORT(308a); . . . IP$_{306f}$, PORT(308a)"), the EBOF NAT table entry for the storage device 308b in the EBOF NAT table 602b includes its private connection information combination (e.g., "IP$_{308b}$, PORT") mapped to its public connection information combination (e.g., "IP$_{306a}$, PORT(308b); IP$_{306b}$, PORT(308b); . . . IP$_{306f}$, PORT(308b)"), and up to the EBOF NAT table entry for the storage device 308f in the EBOF NAT table 602b includes its private connection information combination (e.g., "IP$_{308f}$, PORT") mapped to its public connection information combination (e.g., "IP$_{306a}$, PORT(308f); IP$_{306b}$, PORT(308f); . . . IP$_{306f}$, PORT(308f)").

The method 500 then proceeds to block 514 where the EBOF management subsystem uses the EBOF NAT table to transmit data packets between one or more host devices and one or more of its storage devices. In an embodiment, at block 514, the EBOF management engine 304a in the EBOF storage system 300a (e.g., provided by the EBOF Ethernet switch chip discussed above) included in the networked system 200a may perform data packet transmission operations that may include transmitting data between any of the host devices 202a-202c and any of the storage devices 308a-308f using the EBOF NAT table 602a or 602b described above. While the details of the transmission of data packets using the EBOT NAT tables 602a or 602b is described in further detail below as differing depending on the host device connection configuration of the host devices 202a-202c with the EBOF storage system 300a, one of skill in the art in possession of the present disclosure will appreciate how the EBOF NAT tables 602a and 602b enable scaling of the EBOF storage system 300a by collapsing the relatively large number of internal/back-end private IP addresses assigned to the storage devices 308a-308f (e.g., 24 per EBOF storage system in the specific example provided above) into the relatively small number of external/front-end public IP addresses assigned to the external physical interfaces 306a-306f (e.g., 6 per EBOF storage system in the specific example provided above). Furthermore, one of skill in the art in possession of the present disclosure will appreciate how the EBOF NAT tables 602a and 602b allows external Layer 2 (L2) data traffic (including broadcast and multicast data traffic) to be terminated at the external physical interfaces 306a-306f of the EBOF storage system 300a, resulting in the internal structure of the EBOF storage system 300a being "invisible" to the SAN 204 and host devices 202a-202c connected thereto.

Figure 8:
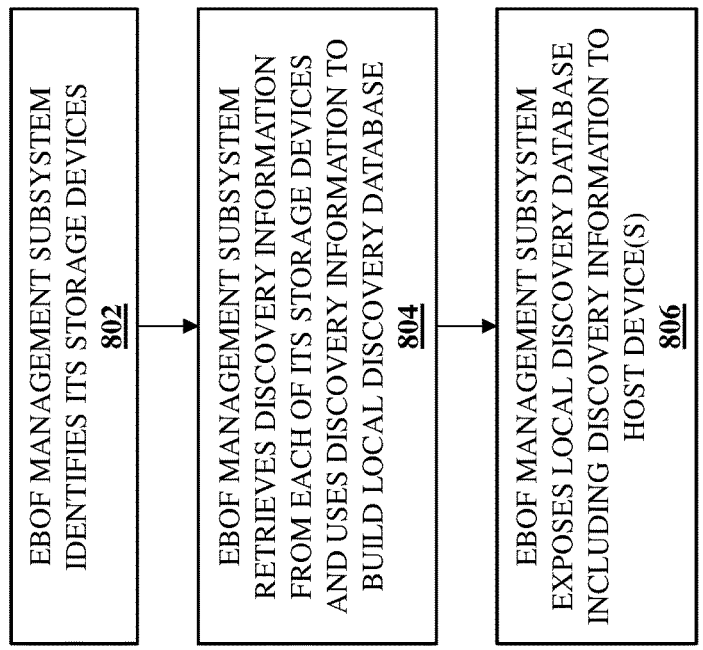
FIG. 8 is a flow chart illustrating an embodiment of a method for providing a scalable EBOF storage system.

Referring now to FIG. 8, an embodiment of a method 800 for providing a scalable Ethernet Bunch Of Flash (EBOF) storage system is illustrated. As discussed below, the systems and methods of the present disclosure provide a single "public" EBOF DDC that collects discovery information from each of the storage devices included in an EBOF storage system and exposes that discovery information to host devices to enable those host devices to discover any of those storage devices. For example, the scalable EBOF storage system of the present disclosure may identify its storage devices. The scalable EBOF storage system then retrieves discovery information from each of its storage devices and uses that discovery information to build a local discovery database. The scalable EBOF storage system then exposes the local discovery database including the discovery information to one or more host devices. As such, scalability of EBOF storage systems connected to SANs is enabled by presenting the EBOF storage system as a single device from a control plane/discovery standpoint.

The method 800 begins at block 802 where an EBOF management subsystem identifies its storage devices. In an embodiment of block 502, the EBOF management engine 304a in the EBOF storage system 300a (e.g., provided by the EBOF CPU discussed above) included in the networked system 200a may perform EBOF storage system identification operations 600 with the storage devices 308a-308f that may include identifying each of the storage devices 308a-308f included in the EBOF system 300a, and one of skill in the art in possession of the present disclosure will appreciate how the storage devices 308a-308f may be identified at block 802 based on the EBOF storage system configuration identification operations 600 discussed above with reference to FIG. 6A, although other techniques for identifying the storage devices 308a-308f in the EBOF storage system 300a will fall within the scope of the present disclosure as well.

Figure 9A:
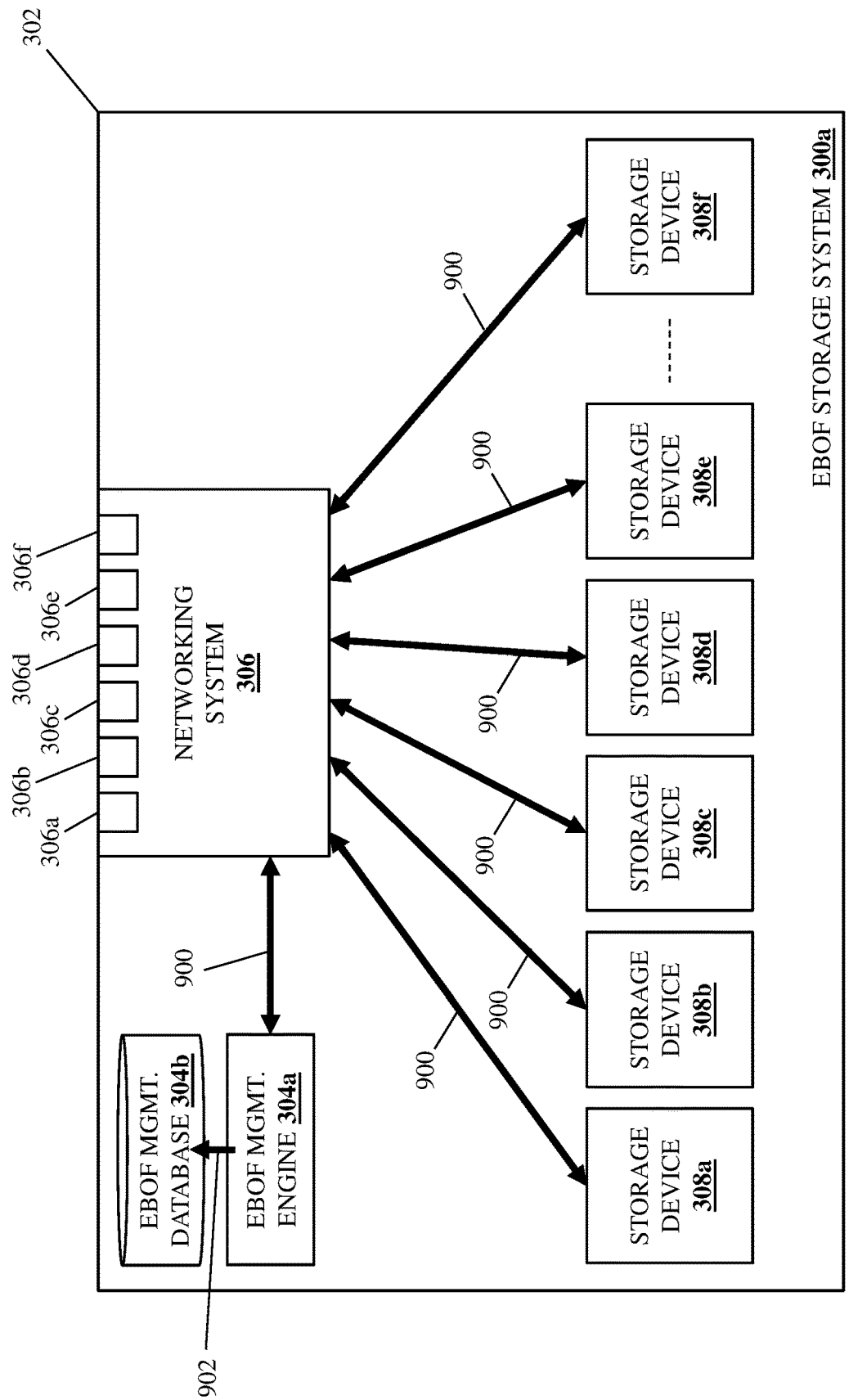
FIG. 9A is a schematic view illustrating an embodiment of the EBOF storage system of FIG. 3A operating during the method of FIG. 8.
Figure 9B:
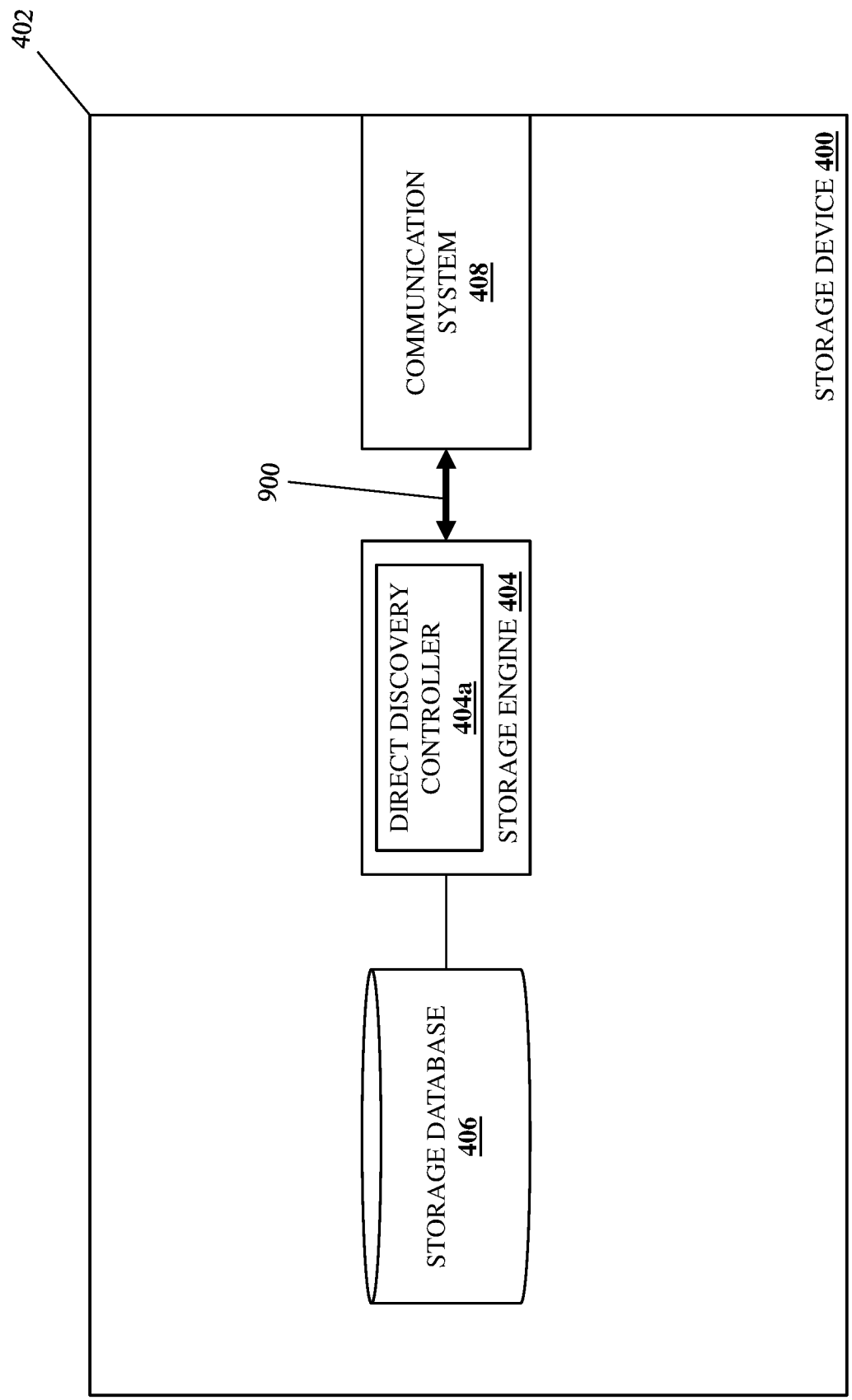
FIG. 9B is a schematic view illustrating an embodiment of the storage device of FIG. 4 operating during the method of FIG. 8.
Figure 10A:
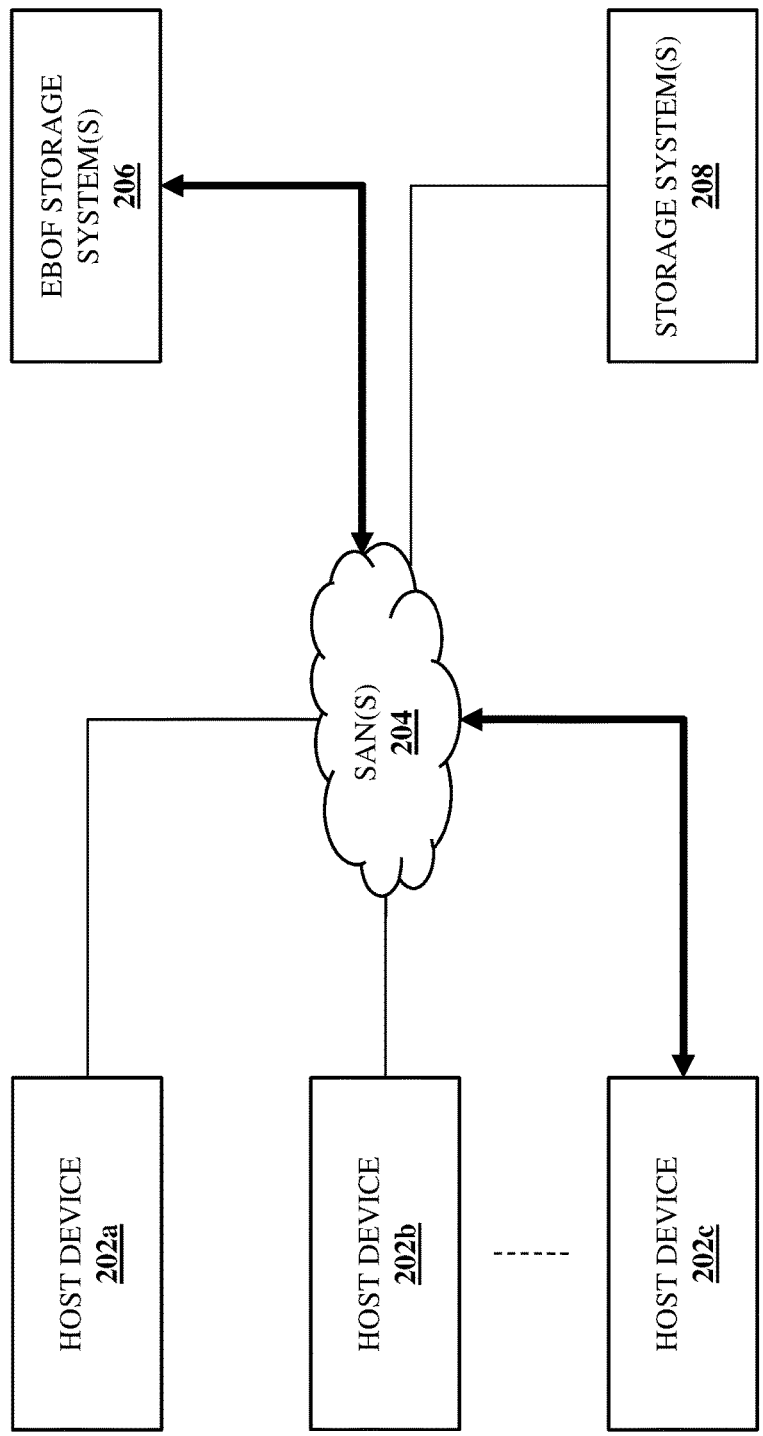
FIG. 10A is a schematic view illustrating an embodiment of the networked system of FIG. 2A operating during the method of FIG. 10.
Figure 10B:
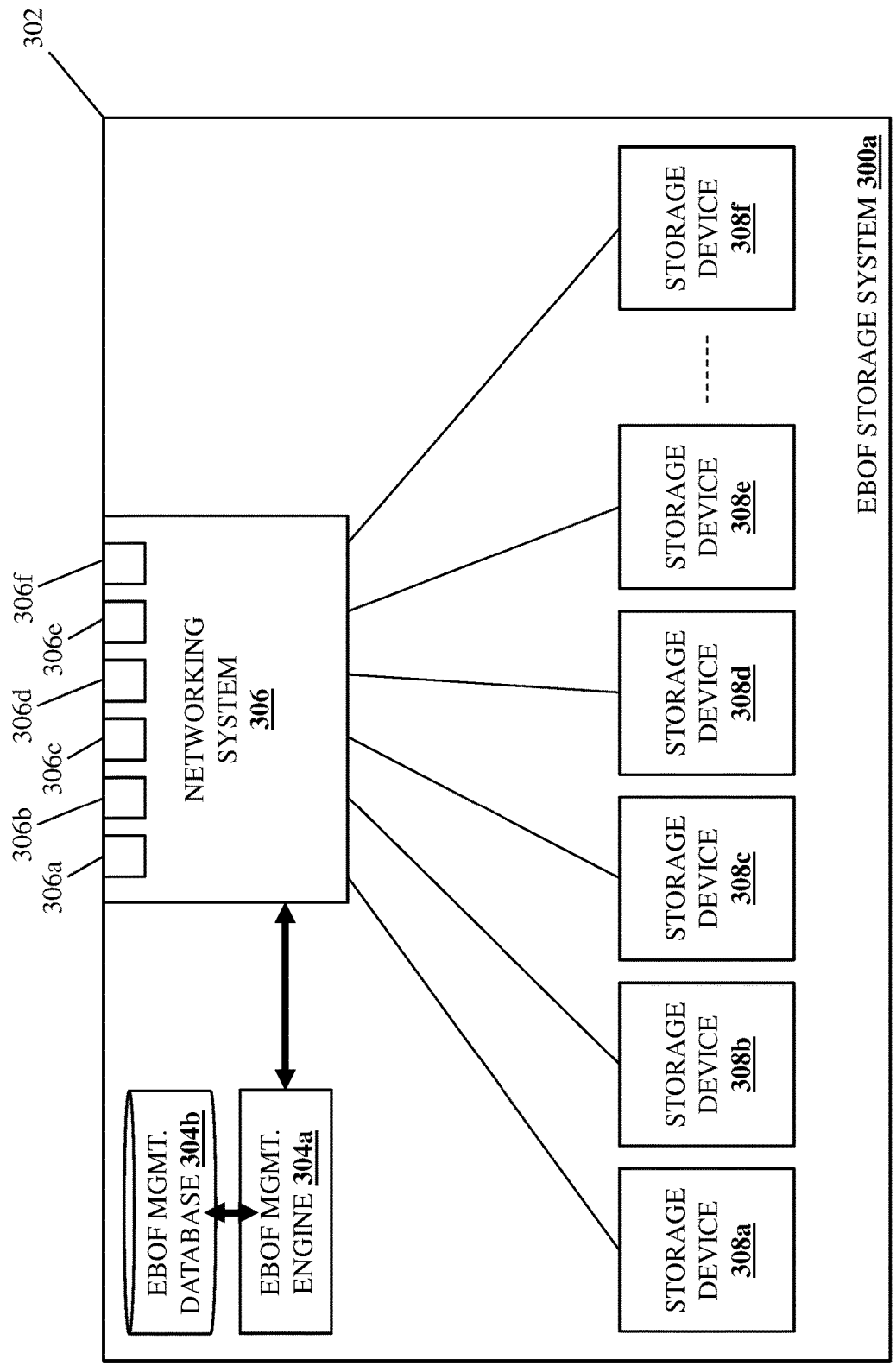
FIG. 10B is a schematic view illustrating an embodiment of the EBOF storage system of FIG. 3A operating during the method of FIG. 10.

The method 800 then proceeds to block 804 where the EBOF management subsystem retrieves discovery information from each of its storage devices and uses the discovery information to build a local discovery database. With reference to FIGS. 9A and 9B, in an embodiment of block 804, the EBOF management engine 304a in the EBOF storage system 300a (e.g., provided by the EBOF CPU discussed above) included in the networked system 200a may perform discovery information retrieval operations 900 with the DDC 404a provided by the storage engine 404 in each of the storage devices 400. To provide a specific example, the discovery information retrieval operations 900 may include the EBOF management engine 304a transmitting NVMe "Get Discovery Log Page" commands to the DDC 404a provided by the storage engine 404 in each of the storage devices 400, and each of those DDCs 404a responding with NVM Subsystem Qualified Name (SUBNQN) discovery information, local transport address discovery information, and/or other discovery information that would be apparent to one of skill in the art in possession of the present disclosure.

The EBOF management engine 304a in the EBOF storage system 300a (e.g., provided by the EBOF CPU discussed above) included in the networked system 200a may then perform local discovery database building operations 902 that may include building a local discovery database in the EBOF management database 304b. For example, the building of the local discovery database may include the EBOF management engine 304a merging the discovery information retrieved from each of the storage devices 308a-308f with their respective entries in the EBOF NAT table 602a or 602b discussed above to generate public discovery log page entries that, as discussed below, may be used to populate an exposed public EBOF DDC.

For example, each DDC 404a in the storage devices 308a-308f/400 may be configured to provide a Discovery Log Page (DLP) including a single DLP Entry (DLPE), with each DLPE including private connectivity information (i.e., the private IP address/port combination) specific to its storage device. As such, the single, public EBOF DDC may retrieve the DLPE from the DDC 404a in each storage device 308a-308f/400, and replace the private connectivity information with the public connectivity information (i.e., the public IP address/port) for that storage device that is mapped to the private connectivity information in the EBOF NAT table. As will be appreciated by one of skill in the art in possession of the present disclosure, once the public EBOF DDC has updated the DLPE from each storage device 308a-308f with the public connectivity information, the public EBOF DDC may respond to "get log page" requests with a response that include the DLPE for each storage device 308a-308f.

The method 800 then proceeds to block 806 where the EBOF management subsystem exposes the local discovery database including the discovery information to one or more host devices. In an embodiment, at block 806, the EBOF management engine 304a in the EBOF storage system 300a (e.g., provided by the EBOF CPU discussed above) included in the networked system 200a may perform local discovery database exposure operations that may include populating an exposed public EBOF DDC with the public discovery log page entries generated using the discovery information retrieved from each of the storage devices 308a-308f, and one of skill in the art in possession of the present disclosure will appreciate how any of the host devices 202a-202c may discover any of the storage device 308a-308f via the public discovery log page entries in the exposed public EBOF DDC, with the exposed public EBOF DDC operating to make the EBOF storage system 300a appears as a single device from a control plane/discovery standpoint (while the EBOF NAT table allows the EBOF storage system 300a to operate in a disaggregated manners for I/O connections from a data plane/data packet transmission standpoint). As such, the EBOF storage systems of the present disclosure may be presented to the host devices 202a-202c with a "non-transparent" EBOF storage system structure such that those host devices "see" the EBOF storage system 300a as a single storage device (rather than as the plurality of storage devices 308a-308f), while "hiding" the Ethernet switch chip/networking system 306 in the EBOF storage system 300a from the SAN 200a such that it is not a part of that SAN 200a and does not require networking protocol management from a SAN administrator.

Figure 11:
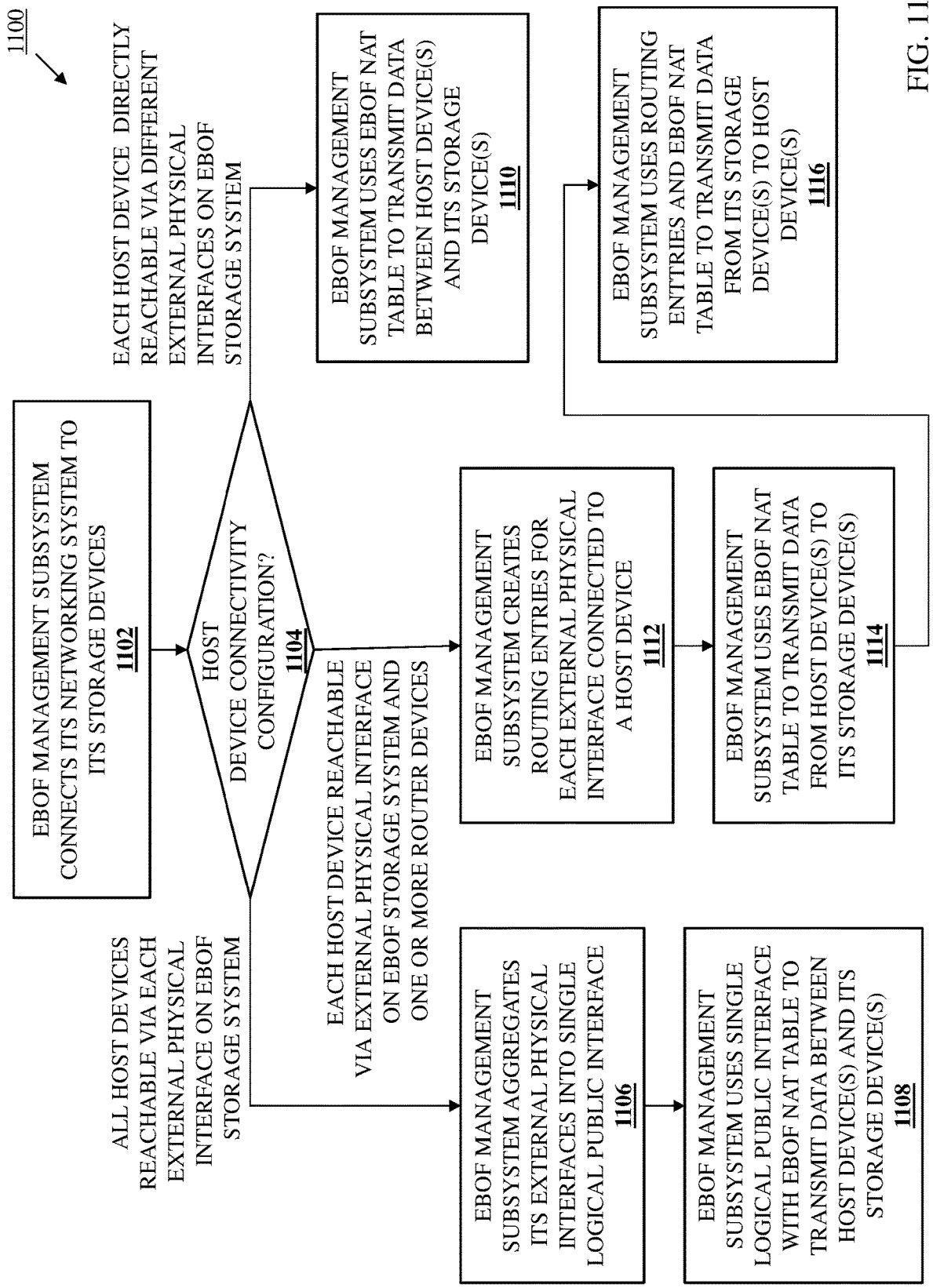
FIG. 11 is a flow chart illustrating an embodiment of a method for providing a scalable EBOF storage system.

Referring now to FIG. 11, an embodiment of a method 1100 for providing a scalable Ethernet Bunch Of Flash (EBOF) storage system is illustrated. As discussed below, the systems and methods of the present disclosure provide different external physical interface configurations and functionality in an EBOF storage system in order to allow the use of the EBOF NAT table configured as discussed above in transmitting data packets between host devices and storage devices in the EBOF storage system. As such, scalability of EBOF storage systems connected to SANs is enabled by reducing the number of connections required by host devices to access storage devices in those EBOF storage systems.

As will be appreciated by one of skill in the art in possession of the present disclosure, the EBOF NAT table 602a discussed above with reference to FIG. 6B is arranged from a point of view of the storage devices 308a-308f in the EBOF storage system 300a. However, when considering how data is routed or otherwise transmitted between the host devices 202a-202c and the storage devices 308a-308f in the EBOF storage system 300a, consider the EBOF NAT table 1200a stored in the EBOF management database 304b illustrated in FIG. 12A that is arranged from a point of view of the external physical interfaces 306a-306f. As can be seen, in the EBOF NAT table 1200a the external physical interface 306a is mapped to the private connection information combination and public information combination for each of the storage devices 308a-308f (e.g., "$IP_{308a}$, $PORT_{308a}$" and "$IP_{306a}$, $PORT_{306a}$(308a)" for the storage device 308a, "$IP_{308b}$, $PORT_{308b}$" and "$IP_{306a}$, $PORT_{306a}$(308b)" for the storage device 308b, and up to "$IP_{308f}$, $PORT_{308f}$" and "$IP_{306a}$, $PORT_{306a}$(308f)" for the storage device 308f).

Similarly, in the EBOF NAT table 1200a the external physical interface 306b is mapped to the private connection information combination and public information combination for each of the storage devices 308a-308f (e.g., "$IP_{308a}$, $PORT_{308a}$" and "$IP_{306b}$, $PORT_{306b}$(308a)" for the storage device 308a, "$IP_{308b}$, $PORT_{308b}$" and "$IP_{306b}$, $PORT_{306b}$(308b)" for the storage device 308b, and up to "$IP_{308f}$, $PORT_{308f}$" and "$IP_{306b}$, $PORT_{306b}$(308f)" for the storage device 308f). Furthermore, each of the external physical interfaces 306a-306f may be mapped in the EBOF NAT table 1200a in a similar manner such that, as illustrated, up to the external physical interface 306f is mapped to the private connection information combination and public information combination for each of the storage devices 308a-308f (e.g., "$IP_{308a}$, $PORT_{308a}$" and "$IP_{306f}$, $PORT_{306f}$(308a)" for the storage device 308a, "$IP_{308b}$, $PORT_{308b}$" and "$IP_{306f}$, $PORT_{306f}$(308b)" for the storage device 308b, and up to "$IP_{308f}$, $PORT_{308f}$" and "$IP_{306f}$, $PORT_{306f}$(308f)" for the storage device 308f).

Similarly as discussed above with the EBOF NAT table 602b, and as illustrated in FIG. 12B, an EBOF NAT table 1200b may be provided similarly to the EBOF NAT table 1200a but with a few simplifying assumptions. As discussed above with the EBOF NAT table 602b, it may be assumed that each of the storage devices 308a-308f provide storage services via the same private port (e.g., the default NVMe port with the port identifier "4420" discussed above, identified as "PORT" in the EBOF NAT table 602b). Furthermore, it may be assumed that any particular one of the storage devices 308a-308f is mapped to the same port identifier for all of the external physical interfaces 306a-306f (e.g., "PORT(308a)" for the storage device 308a, "PORT (308b)" for the storage device 308b, and up to "PORT (308f)" for the storage device 308f in the EBOF NAT table 602b).

As such, the EBOF NAT table entry for the external physical interface 306a in the EBOF NAT table 1200b is mapped to the private connection information combination and public information combination for each of the storage devices 308a-308f (e.g., "$IP_{308a}$, PORT" and "$IP_{306a}$, PORT (308a)" for the storage device 308a, "$IP_{308b}$, PORT" and "$IP_{306a}$, PORT(308b)" for the storage device 308b, and up to "$IP_{308f}$, PORT" and "$IP_{306a}$, PORT(308f)" for the storage device 3080. Similarly, the EBOF NAT table entry for the external physical interface 306b in the EBOF NAT table 1200b is mapped to the private connection information combination and public information combination for each of the storage devices 308a-308f (e.g., "$IP_{308a}$, PORT" and "$IP_{306b}$, PORT(308a)" for the storage device 308a, "$IP_{308b}$, PORT" and "$IP_{306b}$, PORT(308b)" for the storage device 308b, and up to "$IP_{308f}$, PORT" and "$IP_{306b}$, PORT(308f)" for the storage device 3080. Furthermore, each of the external physical interfaces 306a-306f may be mapped in the EBOF NAT table 1200b in a similar manner such that, as illustrated, up to the external physical interface 306f is mapped to the private connection information combination and public information combination for each of the storage devices 308a-308f (e.g., "$IP_{308a}$, PORT" and "$IP_{306f}$, PORT (308a)" for the storage device 308a, "$IP_{308b}$, PORT" and "$IP_{306f}$, PORT(308b)" for the storage device 308b, and up to "$IP_{308f}$, PORT" and "$IP_{306f}$, PORT(308f)" for the storage device 3080.

The method 1100 begins at block 1102 where an EBOF management subsystem connects its networking system to its storage devices. As discussed above, the EBOF management engine 304a in the EBOF storage system 300a (e.g., provided by the EBOF Ethernet switch chip in the networking system 306 discussed above) may include L2 "backend" connectivity to each of the storage devices 308a-308f in its EBOF storage system 300a. In an embodiment, at block 1102, the EBOF management engine 304a may configure the physical interfaces on the networking system 306 connected via the L2 connections (e.g., Ethernet links) to the storage devices 308a-308f (which are in the same private/internal subnet/broadcast domain) as a single logical interface that is reachable via a Media Access Control (MAC) address and IP address (e.g., the default router IP address for each of the storage devices 308a-3080, and may connect to each of the storage devices 308a-308f via those L2 connections/that single logical interface. To provide a specific example, the Address Resolution Protocol (ARP), IP version 6 (IPv6) neighbor discovery, and/or other connection techniques may be utilized to determine the MAC addresses associated with a IP address and/or perform any other operations that one of skill in the art in possession of the present disclosure would recognize as connecting the networking system 306 to the storage devices 308a-308f at block 1102.

The method 1100 then proceeds to decision block 1104 where the method 1100 proceeds depending on the host device connection configuration to the EBOF storage system. As discussed in further detail below and as will be appreciated by one of skill in the art in possession of the present disclosure, the host device connection configurations between the networking system 306 and host devices 202a-202c may require different "frontend" connectivity configurations and/or functionality for the networking system 306. As such, in an embodiment of decision block 1104, the method 1100 may proceed differently depending on whether the host devices 202a-202c are all reachable via each of the external physical interfaces 306a-306f on the networking system 306 in the EBOF storage system 300a, whether each of the host devices 308a-308f are directly reachable via a different one of the external physical interfaces 306a-306f on the networking system 306 in the EBOF storage system 300a, or whether each of the host devices 308a-308f are reachable via a different one of the external physical interfaces 306a-306f on the networking system 306 in the EBOF storage system 300a and one or more router devices.

Furthermore, while three separate host device reachability options are described below for the method 1100 for simplicity, one of skill in the art in possession of the present disclosure will appreciate how the blocks of the method 1100 may be performed for combinations of those host device reachability options (e.g., two or more host device reachable via two or more external physical interfaces, at least one host device directly reachable via a single external physical interface, at least one host device reachable via a single external physical interface and one or more router devices, etc.) while remaining within the scope of the present disclosure as well.

Figure 13:
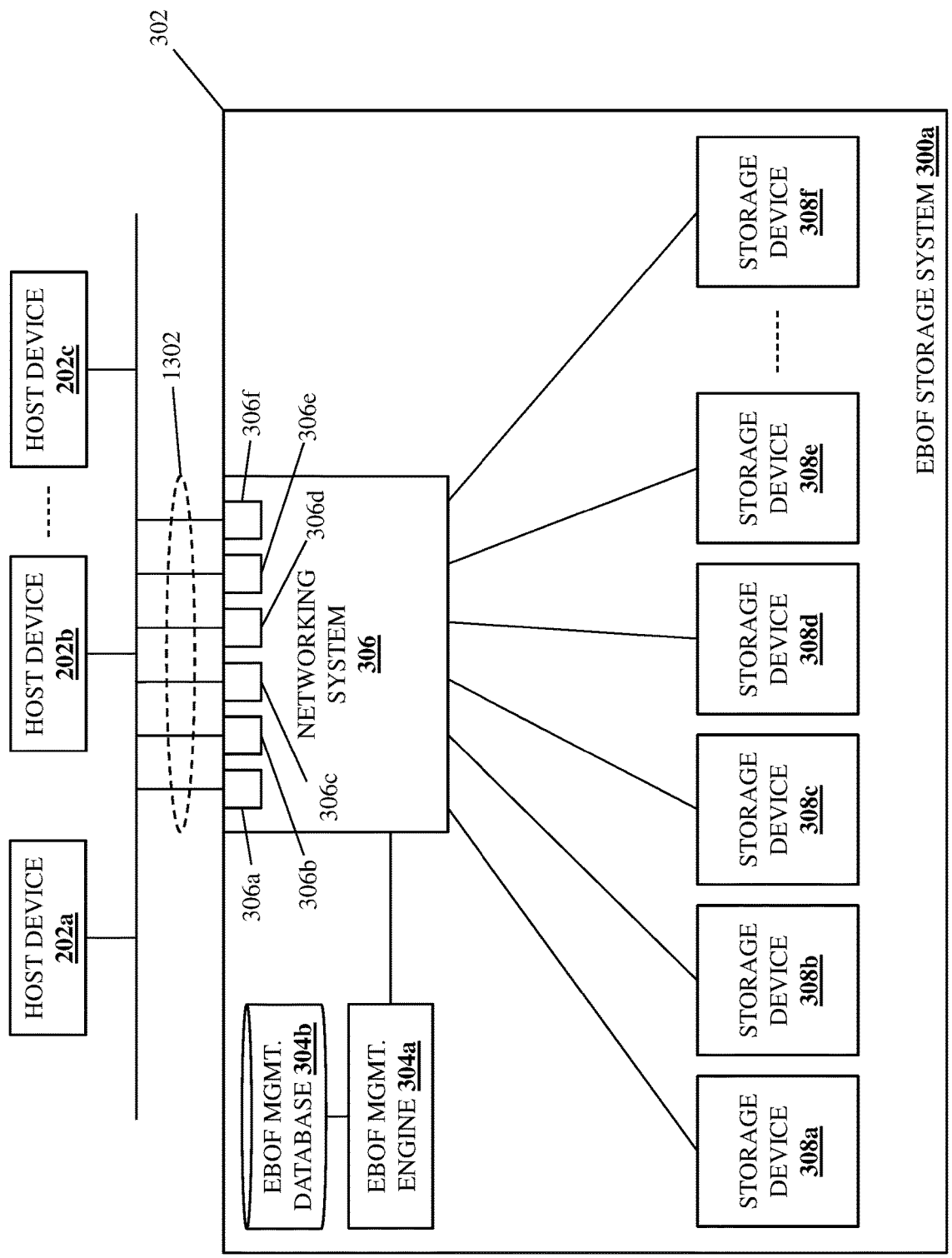
FIG. 13 is a schematic view illustrating an embodiment of the EBOF storage system of FIG. 3A operating during the method of FIG. 11.

If, at decision block 1104, all the host devices are reachable via each external physical interface on the EBOF storage system, the method 1100 proceeds to block 1106 where the EBOF management subsystem aggregates its external physical interfaces into a single logical interface. As illustrated in FIG. 13, in an embodiment of decision block 1104, each of the host devices 202a-202c may be connected to each of the external physical interfaces 306a-306f on the networking system 306 (e.g., each of the host devices 308a-308f may be provided on the same local subnet) and may be reachable via L2 connections. As such, in an embodiment of block 1106 and based on the host devices 202a-202c being reachable via each external physical interface 306a-306f on the EBOF storage system 300a, the EBOF management engine 304a in the EBOF storage system 300a (e.g., provided by the EBOF CPU discussed above) may configure the external physical interfaces 306a-306f as a single, link aggregated logical "public" interface 1302. As will be appreciated by one of skill in the art in possession of the present disclosure, ARP, IPv6 neighbor discovery, and/or other connection techniques may be utilized to determine the MAC addresses associated with a IP address and/or perform any other operations that one of skill in the art in possession of the present disclosure would recognize as connecting the networking system 306 to the host devices 202a-202c at block 1106 to provide the "frontend" connectivity discussed above.

The method 1100 then proceeds to block 1108 where the EBOF management subsystem uses the single logical public interface with the EBOF NAT table to transmit data between one or more host devices and one or more of its storage devices. In an embodiment, at block 1108, data transmission (e.g., IP packet forwarding) may be performed by the EBOF management engine 304a in the EBOF storage system 300a (e.g., provided by the EBOF Ethernet switch chip in the networking system 306 discussed above) between the external physical interfaces 306a-306f and the storage devices 308a-308f using the single, link aggregated logical "public" interface 1302 provided for the external physical interfaces 306a-306f and the L2 connections to the storage devices 308a-308f as discussed above.

Similarly as discussed above, the EBOF NAT tables generated according to the method 500 may be simplified (or further simplified in the case of the EBOF NAT tables 602b and 1200b) due to the use of the single logical "public" interface 1302 (e.g., by replacing the public IP addresses "$IP_{306a}$", "$IP_{306b}$", . . . "$IP_{306c}$" of the external physical interfaces 306a-306f in the EBOF NAT tables 1200a or 1200b with a single IP address (e.g., "IP" in the examples below) for that single logical "public" interface 1302). To provide a specific example of forwarding data packets received from the host devices 202a-202c to the storage devices 308a-308f using the EBOF NAT table 1200b discussed above, with reference to FIGS. 12B and 13, the EBOF management engine 304a (e.g., provided by the EBOF Ethernet switch chip in the networking system 306 discussed above) may receive an IP data packet via the single logical "public" interface 1302 (i.e., using any of the external physical interfaces 306a-306f) from any of the host devices 202a-202c, with that IP data packet including the public IP address of the single logical "public" interface 1302 (e.g. "IP") as its destination IP address and the public port identifier for the storage device 308*b* (e.g., "PORT (308*b*)") as its destination port identifier.

The EBOF management engine 304*a* may then use the EBOF NAT table 1200*b* (e.g., the EBOF NAT table entry for the external physical interface 306*b* including the public IP address of the single logical "public" interface 1302 and the public port identifier for the storage device 308*b* (e.g., "IP, PORT(308*b*)")) to identify the private IP address and private port identifier for the storage device 308*b* (e.g., "IP$_{308b}$, PORT"), and may rewrite the destination IP address in that IP data packet with the private IP address of the storage device 308*b* (e.g., "IP$_{308b}$,") and the destination port identifier in that IP data packet with the private port identifier of the storage device 308*b* ("PORT"), and forward that IP data packet via its L2 connection to the storage device 308*b*.

To provide a specific example of forwarding data packets received from storage devices 308*a*-308*f* to the host devices 202*a*-202*c* to the using the EBOF NAT table 1200*b* discussed above, with reference to FIGS. 12B and 13, the EBOF management engine 304*a* (e.g., provided by the EBOF Ethernet switch chip in the networking system 306 discussed above) may receive an IP data packet via any of the L2 connections from the storage device 308*b*, with that IP data packet including the private IP address of the storage device 308*b* (e.g. "IP$_{308b}$") as its source IP address and the private port identifier for the storage device 308*b* (e.g., "PORT") as its source port identifier.

The EBOF management engine 304*a* may then use the EBOF NAT table 1200*b* (e.g., the EBOF NAT table entry for the external physical interface 306*b* including the private IP address of the storage device 308*b* and the private port identifier for the storage device 308*b* (e.g., "IP$_{308b}$, PORT")) to identify the public IP address of the single logical "public" interface 1302 and the public port identifier for the storage device 308*b* (e.g., "IP, PORT(308*b*)"), and may rewrite the source IP address in that IP data packet with the public IP address of the single logical "public" interface 1302 (e.g., "IP") and the source port identifier in that IP data packet with the public port identifier for the storage device 308*b* ("PORT(308*b*)"). The EBOF management engine 304*a* may then forward that IP data packet via the single logical "public" interface 1302 to the host device identified by storage device 308*b* using the destination IP address provided by the storage device 308*b* in the IP data packet.

Figure 14:
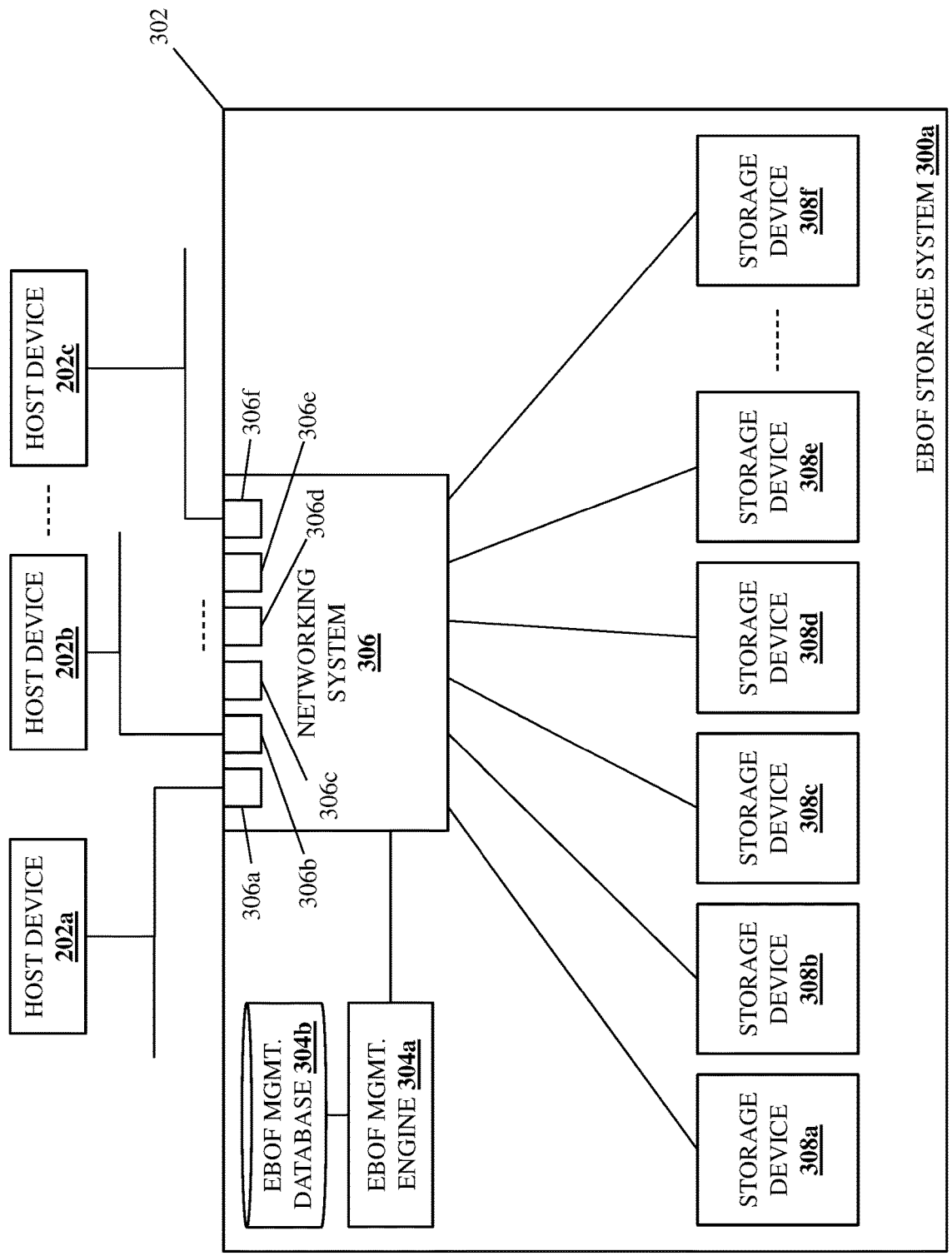
FIG. 14 is a schematic view illustrating an embodiment of the EBOF storage system of FIG. 3A operating during the method of FIG. 11.

As illustrated in FIG. 14, in an embodiment of decision block 1104, each of the host devices 202*a*-202*c* may be "on-link" host devices that are directly connected to a respective one of the external physical interfaces 306*a*-306*f* on the networking system 306 (e.g., with the illustrated embodiment including the host device 202*a* directly connected to the external physical interface 306*a* and provided on a first local subnet, the host device 202*b* directly connected to the external physical interface 306*b* and provided on a second local subnet, and up to the host device 202*c* directly connected to the external physical interface 306*f* and provided on an nth local subnet in the illustrated embodiment) and may be reachable via L2 connections. As will be appreciated by one of skill in the art in possession of the present disclosure, ARP, IPv6 neighbor discovery, and/or other connection techniques may be utilized to determine the MAC addresses associated with a IP address and/or perform any other operations that one of skill in the art in possession of the present disclosure would recognize as connecting the networking system 306 to the host devices 202*a*-202*c* at block 1106 to provide the "frontend" connectivity discussed above.

If, at decision block 1104, each host device is directly reachable via different external physical interfaces on the EBOF storage system, the method 1100 proceeds to block 1110 where the EBOF management subsystem uses the EBOF NAT table to transmit data between one or more host devices and one or more of its storage devices. To provide a specific example of forwarding data packets received from the host devices 202*a*-202*c* to the storage devices 308*a*-308*f* using the EBOF NAT table 1200*b* discussed above, with reference to FIGS. 12B and 14, the EBOF management engine 304*a* (e.g., provided by the EBOF Ethernet switch chip in the networking system 306 discussed above) may receive an IP data packet from the host device 202*b* via the external physical interface 306*b*, with that IP data packet including the public IP address of the external physical interface 306*b* (e.g. "IP$_{306b}$") as its destination IP address and the public port identifier for the storage device 308*b* (e.g., "PORT(308*b*)") as its destination port identifier.

The EBOF management engine 304*a* may then use the EBOF NAT table 1200*b* (e.g., the EBOF NAT table entry for the external physical interface 306*b* including the public IP address of the external physical interface 306*b* and the public port identifier for the storage device 308*b* (e.g., "IP$_{306b}$, PORT(308*b*)")) to identify the private IP address and private port identifier for the storage device 308*b* (e.g., "IP$_{308b}$, PORT"), and may rewrite the destination IP address in that IP data packet with the private IP address of the storage device 308*b* (e.g., "IP$_{308b}$,") and the destination port identifier in that IP data packet with the private port identifier of the storage device 308*b* ("PORT"), and forward that IP data packet via its L2 connection to the storage device 308*b*.

To provide a specific example of forwarding data packets received from storage devices 308*a*-308*f* to the host devices 202*a*-202*c* to the using the EBOF NAT table 1200*b* discussed above, with reference to FIGS. 12B and 14, the EBOF management engine 304*a* (e.g., provided by the EBOF Ethernet switch chip in the networking system 306 discussed above) may receive an IP data packet via its L2 connection with the storage device 308*b*, with that IP data packet including the private IP address of the storage device 308*b* (e.g. "IP$_{308b}$") as its source IP address and the private port identifier for the storage device 308*b* (e.g., "PORT") as its source port identifier.

The EBOF management engine 304*a* may then use the destination IP address provided by the storage device 308*b* in the IP data packet to identify the external physical interface 306*b* through which to forward that IP data packet based on, for example, that external physical interface 306*b* including the subnet in that destination IP address. The EBOF management engine 304*a* may then use the EBOF NAT table 1200*b* (e.g., the EBOF NAT table entry for the external physical interface 306*b* including the private IP address of the storage device 308*b* and the private port identifier for the storage device 308*b* (e.g., "IP$_{308b}$, PORT")) to identify the public IP address of the external physical interface 306*b* and the public port identifier for the storage device 308*b* (e.g., "IP$_{306b}$, PORT(308*b*)"), and may rewrite the source IP address in that IP data packet with the public IP address of the external physical interface 306*b* (e.g., "IP$_{306b}$") and the source port identifier in that IP data packet with the public port identifier for the storage device 308*b* ("PORT(308*b*)"). The EBOF management engine 304*a* may then forward that IP data packet via the external physical interface 306b to the host device 202b.

Figure 15:
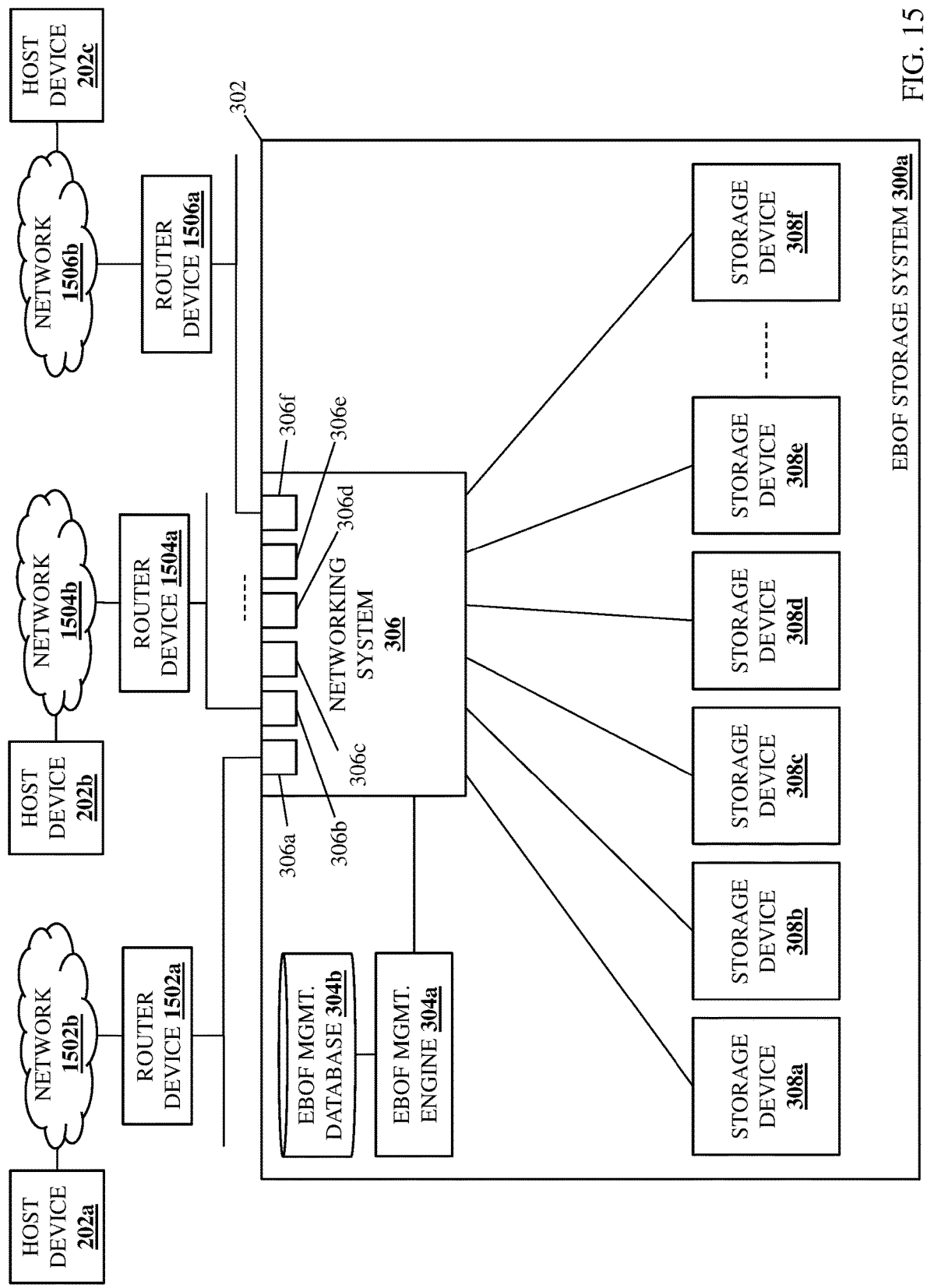
FIG. 15 is a schematic view illustrating an embodiment of the EBOF storage system of FIG. 3A operating during the method of FIG. 11.

As illustrated in FIG. 15, in an embodiment of decision block 1104, each of the host devices 202a-202c may be provided by "off-link" host devices that are connected to a respective one of the external physical interfaces 306a-306f on the networking system 306 via one or more router devices (e.g., with the illustrated embodiment including the host device 202a connected to the external physical interface 306a via a router device 1502a and a network 1502b, the host device 202b connected to the external physical interface 306b via a router device 1504a and a network 1504b, and up to the host device 202c connected to the external physical interface 306f via a router device 1506a and a network 1506b in the illustrated embodiment) and may be reachable via L2 connections.

If, at decision block 1104, each host device is reachable via an external physical interface on the EBOF storage system and one or more router devices, the method 1100 proceeds to block 1112 where the EBOF management subsystem creates routing entries for each external physical interface connected to a host device. As will be appreciated by one of skill in the art in possession of the present disclosure, in host device connection configurations like that illustrated in FIG. 15 where more than one router device couples the host devices 202a-202c to the external physical interfaces 306a-306f, the destination IP address provided in IP data packets by the storage devices 308a-308f will not be sufficient to identify the external physical interface on the networking system 306 for use in forwarding those IP data packets to their next hop on the way to the host device that provides their destination. Furthermore, attempts to use routing protocols to program forwarding tables for the networking system 306 will prevent the EBOF storage system 300a from appearing as an IP endpoint at its external physical interfaces 306a-306f.

As such, to address these issue, block 1112 of the method 1100 takes advantage of that fact that connections with the EBOF storage system 300a are initiated by the host devices 202a-202c (rather than the its storage devices 308a-308f), and operates to create routing entries when those host devices establish connections to the EBOF storage system 300a in manner that one of skill in the art in possession of the present disclosure will appreciate allows the EBOF storage system 300a to appear as an IP endpoint at its external physical interfaces 306a-306f. To provide a specific example, in an embodiment of block 1112, the EBOF management engine 304a in the EBOF storage system 300a (e.g., provided by the EBOF CPU discussed above) may receive (e.g., from the Ethernet switch chip in the networking system 206) an IP data packet that was transmitted by the host device 202b and received at the external physical interface 306b on the networking system 306 to establish a TCP connection with the EBOF storage system 300a (e.g., and that may include a TCP SYNnchronize (TCP SYN) segment).

In response to receiving the IP data packet through the external physical interface 306b from the host device 202b to establish a TCP connection, the EBOF management engine 304a (e.g., provided by the EBOF CPU discussed above) may create a route entry for the host device 202b/external physical interface 306b and provide that route entry in a forwarding table used by the Ethernet switch chip in the networking system 306 (e.g., in the EBOF management database 304b). For example, the route entry created and provided in the forwarding table at block 1112 may include a route entry "key" that is provided by a source IP address of the host device 202b (e.g., "$IP_{202b}$") that was included in the received IP data packet, along with "next hop" information that is provided by an external physical interface identifier for the external physical interface 306b (e.g., "$Interface_{306b}$") and a source MAC address of the router device 1504a (e.g., "$MAC_{1504a}$") that were included in the received IP data packet:

$IP_{202b} \rightarrow Interface_{306b}, MAC_{1504a}$

The method 1100 then proceeds to block 1114 where the EBOF management subsystem uses the EBOF NAT table to transmit data from one or more host devices to one or more of its storage devices. To provide a specific example of forwarding data packets received from the host devices 202a-202c to the storage devices 308a-308f using the EBOF NAT table 1200b discussed above, in an embodiment of block 1114 and with reference to FIGS. 12B and 15, the EBOF management engine 304a (e.g., provided by the EBOF Ethernet switch chip in the networking system 306 discussed above) may receive an IP data packet from the host device 202b via the external physical interface 306b, with that IP data packet including the public IP address of the external physical interface 306b (e.g. "$IP_{306b}$") as its destination IP address and the public port identifier for the storage device 308b (e.g., "PORT(308b)") as its destination port identifier.

The EBOF management engine 304a may then use the EBOF NAT table 1200b (e.g., the EBOF NAT table entry for the external physical interface 306b including the public IP address of the external physical interface 306b and the public port identifier for the storage device 308b (e.g., "$IP_{306b}$, PORT(308b)")) to identify the private IP address and private port identifier for the storage device 308b (e.g., "$IP_{308b}$, PORT"), and may rewrite the destination IP address in that IP data packet with the private IP address of the storage device 308b (e.g., "$IP_{308b}$") and the destination port identifier in that IP data packet with the private port identifier of the storage device 308b ("PORT"), and forward that IP data packet via its L2 connection to the storage device 308b.

The method 1100 then proceeds to block 1116 where the EBOF management subsystem uses the routing entries and the EBOF NAT table to transmit data from one or more of its storage devices to one or more host devices. To provide a specific example of forwarding data packets received from storage devices 308a-308f to the host devices 202a-202c using the routing entries and the EBOF NAT table 1200b discussed above, in an embodiment of block 1116 and with reference to FIGS. 12B and 15, the EBOF management engine 304a (e.g., provided by the EBOF Ethernet switch chip in the networking system 306 discussed above) may receive an IP data packet via its L2 connection with the storage device 308b, with that IP data packet including the private IP address of the storage device 308b (e.g. "$IP_{308b}$") as its source IP address and the private port identifier for the storage device 308b (e.g., "PORT") as its source port identifier, and a destination IP address of the host device 202b in this specific example.

The EBOF management engine 304a may then use the destination IP address of the host device 202b (e.g., "$IP_{202b}$") included in the IP data packet as a lookup into the forwarding table used by the Ethernet switch chip in the networking system 306 to identify the external physical interface 306b and the MAC address of the router device 1504a through which the host device 202b may be reached (e.g., "$Interface_{306b}$, $MAC_{1504a}$"). One of skill in the art in possession of the present disclosure will appreciate how the identification of the external physical interface 306b may be used by the EBOF management engine 304a with the EBOF NAT table 1200b (e.g., the EBOF NAT table entry for the external physical interface 306b including the private IP address of the storage device 308b and the private port identifier for the storage device 308b (e.g., "$IP_{308b}$, PORT")) to identify the public IP address of the external physical interface 306b and the public port identifier for the storage device 308b (e.g., "$IP_{306b}$, PORT(308b)"), and may rewrite the source IP address in that IP data packet with the public IP address of the external physical interface 306b (e.g., "$IP_{306b}$") and the source port identifier in that IP data packet with the public port identifier for the storage device 308b ("PORT(308b)"), and may provide the MAC address of the router device 1504b (e.g., "$MAC_{1504a}$") as next hop information in that IP data packet. The EBOF management engine 304a may then forward that IP data packet via the external physical interface 306b and through the router device 1504b to the host device 202b.

As will be appreciated by one of skill in the art in possession of the present disclosure, the routing entry provided in the forwarding table used by the networking system 306 may be removed when it is no longer needed using a variety of techniques. For example, the EBOF management engine 304a (e.g., provided by the EBOF CPU discussed above) may leverage the fact that TCP connections are terminated on the storage devices 308a-308c, and may remove routing entries from the forwarding table in response to a storage device terminating a related TCP connection. To provide a specific example, the EBOF management engine 304a (e.g., provided by the EBOF CPU discussed above) may periodically query (e.g., each hour) each storage devices 308a-308f to retrieve a list of active TCP connections for those storage devices, and any route entries in the forwarding table related to IP addresses of host devices that are no longer associated with an active TCP connection may be purged from those forwarding tables.

Thus, systems and methods have been described that provide for the generation of an EBOF NAT table that allows an EBOF storage system to present a relatively small number of "front-end" public IP addresses associated with its external physical interface for use in accessing its storage devices via a relatively larger number of internal/"back-end" private IP addresses associated with those storage device. Furthermore, systems and methods have been described that provide a single "public" EBOF DDC that collects discovery information from each of the storage devices included in an EBOF storage system and exposes that discovery information to host devices to enable those host devices to discover any of those storage devices. Further still, systems and methods have been described that provide different external physical interface configurations and functionality in an EBOF storage system in order to allow the use of the EBOF NAT table configured as discussed above in transmitting data packets between host devices and storage devices in the EBOF storage system. As such, scalability of EBOF storage systems connected to SANs is enabled relative to conventional EBOF storage systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networked system, comprising:
a Storage Area Network (SAN);
a host device that is coupled to the SAN; and
an Ethernet Bunch Of Flash (EBOF) storage system that is coupled to the SAN and that is configured to:
  identify storage devices that are included in the EBOF storage system and external physical interfaces that are accessible on the EBOF storage system;
  identify a respective public IP address assigned to each of the external physical interfaces;
  assign a respective private Internet Protocol (IP) address to each of the storage devices, at least one private port identifier to the storage devices, and at least one respective public port identifier to each of the storage devices for one or more of the external physical interfaces;
  generate an EBOF Network Address Translation (NAT) table by mapping, for each storage device:
    each respective public IP address assigned to the external physical interfaces to the public port identifier assigned to that storage device for that external physical interface to provide an external physical interface public IP address/storage device public port combination for that storage device;
    the private IP address assigned to that storage device to the private port identifier assigned to that storage device to provide a private IP address/private port identifier combination for that storage device; and
    the private IP address/private port identifier combination for that storage device to the external physical interface public IP address/storage device public port combination for that storage device; and
  use the EBOF NAT table to transmit data packets between the host device and one or more of the storage devices.

2. The system of claim 1, wherein the at least one private port identifier assigned to the storage devices is provided by common private port identifier assigned to all of the storage devices, and wherein the at least one respective public port identifier assigned to each of the storage devices for one or more of the external physical interfaces is provided by a respective common public port assigned to each of the storage devices for all of the external physical interfaces.

3. The system of claim 1, wherein the EBOF storage system is configured to:
retrieve discovery information from Direct Discovery Controllers (DDCs) in each of the storage devices; and
expose the discovery information to the host device via the SAN.

4. The system of claim 1, wherein the EBOF storage system includes:
an Ethernet switch device having a logical interface that includes a Media Access Control (MAC) address and an IP address that is a default router address for the storage devices, and wherein the Ethernet switch device is configured to use the MAC address and IP address of the logical interface to connect to each of the storage devices.

5. The system of claim 1, wherein the host device is a first host device that is reachable via each of the external physical interfaces, and wherein the system further includes:
at least one second host device that is reachable via each of the external physical interfaces, wherein the EBOF storage system is configured to:

aggregate the external physical interfaces into a single logical interface that is used with the EBOF NAT table to transmit data packets between one or more of the storage devices and each of the first host device and the at least one second host device.

6. The system of claim 1, wherein the host device is reachable via a first external physical interface included in the external physical interfaces and through a router device, and wherein the EBOF storage system is configured to:
  receive, from the host device, a connection request to connect to the EBOF storage system via the first external physical interface;
  create, in response to receiving the connection request, a routing entry including:
    a forwarding entry key provided by an IP address of the host device that is included in the connection request; and
    next hop information provided by a first external physical interface identifier for the first external physical interface and a MAC address of one of the router device that is included in the connection request; and
  use the routing entry with the EBOF NAT table to forward data packets transmitted from the one or more of the storage devices to the host device via the first external physical interface.

7. An Information Handling System (IHS), comprising:
  a processing system; and
  a memory system that is coupled to the processing system and that includes instructions that, when executed by the processing system, cause the processing system to provide an Ethernet Bunch Of Flash (EBOF) management engine that is configured to:
    identify storage devices that are connected to the processing system and external physical interfaces that are connected to the processing system;
    identify a respective public IP address assigned to each of the external physical interfaces;
    assign a respective private Internet Protocol (IP) address to each of the storage devices, at least one private port identifier to the storage devices, and at least one respective public port identifier to each of the storage devices for one or more of the external physical interfaces;
    generate an EBOF Network Address Translation (NAT) table by mapping, for each storage device:
      each respective public IP address assigned to the external physical interfaces to the public port identifier assigned to that storage device for that external physical interface to provide an external physical interface public IP address/storage device public port combination for that storage device;
      the private IP address assigned to that storage device to the private port identifier assigned to that storage device to provide a private IP address/private port identifier combination for that storage device; and
      the private IP address/private port identifier combination for that storage device to the external physical interface public IP address/storage device public port combination for that storage device; and
    use the EBOF NAT table to transmit data packets between a host device and one or more of the storage devices.

8. The IHS of claim 7, wherein the at least one private port identifier assigned to the storage devices is provided by common private port identifier assigned to all of the storage devices, and wherein the at least one respective public port identifier assigned to each of the storage devices for one or more of the external physical interfaces is provided by a respective common public port assigned to each of the storage devices for all of the external physical interfaces.

9. The IHS of claim 7, wherein the EBOF management engine is configured to:
  retrieve discovery information from Direct Discovery Controllers (DDCs) in each of the storage devices; and
  expose the discovery information to the host device.

10. The IHS of claim 7, wherein the processing system includes:
  an Ethernet switch device having a logical interface that includes a Media Access Control (MAC) address and an IP address that is a default router address for the storage devices, and wherein the Ethernet switch device is configured to use the MAC address and IP address of the logical interface to connect to each of the storage devices.

11. The IHS of claim 7, wherein the host device is a first host device that is reachable via each of the external physical interfaces, wherein at least one second host device is reachable via each of the external physical interfaces, and wherein the EBOF management engine is configured to:
  aggregate the external physical interfaces into a single logical interface that is used with the EBOF NAT table to transmit data packets between one or more of the storage devices and each of the first host device and the at least one second host device.

12. The IHS of claim 7, wherein the host device is a first host device that is reachable via a first external physical interface included in the external physical interfaces, wherein a second host device is reachable via a second external physical interface included in the external physical interfaces, and wherein the EBOF management engine is configured to:
  use the EBOF NAT table to forward first data packets transmitted from the one or more of the storage devices to the first host device via the first external physical interface, and to forward second data packets transmitted from the one or more of the storage devices to the second host device via the second external physical interface.

13. The IHS of claim 7, wherein the host device is reachable via a first external physical interface included in the external physical interfaces and through a router device, and wherein the EBOF management engine is configured to:
  receive, from the host device, a connection request to connect to the EBOF storage system via the first external physical interface;
  create, in response to receiving the connection request, a routing entry including:
    a forwarding entry key provided by an IP address of the host device that is included in the connection request; and
    next hop information provided by a first external physical interface identifier for the first external physical interface and a MAC address of the router device that is included in the connection request; and
  use the routing entry with the EBOF NAT table to forward data packets transmitted from the one or more of the storage devices to the host device via the first external physical interface.

14. A method for providing a scalable Ethernet Bunch Of Flash (EBOF) storage system, comprising:
- identifying, by an EBOF management subsystem, storage devices that are connected to the processing system and external physical interfaces that are connected to the processing system;
- identifying, by the EBOF management subsystem, a respective public IP address assigned to each of the external physical interfaces;
- assigning, by the EBOF management subsystem, a respective private Internet Protocol (IP) address to each of the storage devices, at least one private port identifier to the storage devices, and at least one respective public port identifier to each of the storage devices for one or more of the external physical interfaces;
- generating, by the EBOF management subsystem, an EBOF Network Address Translation (NAT) table by mapping, for each storage device:
  - each respective public IP address assigned to the external physical interfaces to the public port identifier assigned to that storage device for that external physical interface to provide an external physical interface public IP address/storage device public port combination for that storage device;
  - the private IP address assigned to that storage device to the private port identifier assigned to that storage device to provide a private IP address/private port identifier combination for that storage device; and
  - the private IP address/private port identifier combination for that storage device to the external physical interface public IP address/storage device public port combination for that storage device; and
- using, by the EBOF management subsystem, the EBOF NAT table to transmit data packets between a host device and one or more of the storage devices.

15. The method of claim 14, wherein the at least one private port identifier assigned to the storage devices is provided by common private port identifier assigned to all of the storage devices, and wherein the at least one respective public port identifier assigned to each of the storage devices for one or more of the external physical interfaces is provided by a respective common public port assigned to each of the storage devices for all of the external physical interfaces.

16. The method of claim 14, further comprising:
- retrieving, by the EBOF management subsystem, discovery information from Direct Discovery Controllers (DDCs) in each of the storage devices; and
- exposing, by the EBOF management subsystem, the discovery information to the host device.

17. The method of claim 14, wherein the EBOF management subsystem includes:
- an Ethernet switch device having a logical interface that includes a Media Access Control (MAC) address and an IP address that is a default router address for the storage devices, and wherein the Ethernet switch device is configured to use the MAC address and IP address of the logical interface to connect to each of the storage devices.

18. The method of claim 14, wherein the host device is a first host device that is reachable via each of the external physical interfaces, wherein at least one second host device is reachable via each of the external physical interfaces, and wherein the method further comprises:
- aggregating, by the EBOF management subsystem, the external physical interfaces into a single logical interface that is used with the EBOF NAT table to transmit data packets between one or more of the storage devices and each of the first host device and the at least one second host device.

19. The method of claim 14, wherein the host device is a first host device that is reachable via a first external physical interface included in the external physical interfaces, wherein a second host device is reachable via a second external physical interface included in the external physical interfaces, and wherein the method further comprises:
- using, by the EBOF management subsystem, the EBOF NAT table to forward first data packets transmitted from the one or more of the storage devices to the first host device via the first external physical interface, and to forward second data packets transmitted from the one or more of the storage devices to the second host device via the second external physical interface.

20. The method of claim 14, wherein the host device is reachable via a first external physical interface included in the external physical interfaces and through a router device, and wherein the method further comprises:
- receiving, by the EBOF management subsystem from the host device, a connection request to connect to the EBOF storage system via the first external physical interface;
- creating, by the EBOF management subsystem in response to receiving the connection request, a routing entry including:
  - a forwarding entry key provided by an IP address of the host device that is included in the connection request; and
  - next hop information provided by a first external physical interface identifier for the first external physical interface and a MAC address of the router device that is included in the connection request; and
- using, by the EBOF management subsystem, the routing entry with the EBOF NAT table to forward data packets transmitted from the one or more of the storage devices to the host device via the first external physical interface.

* * * * *

UNITED STATES PATENT AND TRADEMARK OFFICE
CERTIFICATE OF CORRECTION

PATENT NO. : 11,831,715 B1
APPLICATION NO. : 18/172587
DATED : November 28, 2023
INVENTOR(S) : DeSanti et al.

It is certified that error appears in the above-identified patent and that said Letters Patent is hereby corrected as shown below:

On the Title Page

Item (72), Inventors: "Joseph Lasalle White" should be changed to --Joseph LaSalle White--

In the Specification

Column 18, Line 64, "device 3080." should read --device 308f).--

Column 19, Line 5, "device 3080." should read --device 308f).--

Column 19, Line 15, "device 3080." should read --device 308f).--

Column 19, Line 31, "devices 308a-3080," should read --devices 308a-308f),--

Signed and Sealed this
Sixteenth Day of April, 2024

Katherine Kelly Vidal
Director of the United States Patent and Trademark Office